(12) United States Patent
Ichimi

(10) Patent No.: US 11,838,455 B2
(45) Date of Patent: Dec. 5, 2023

(54) INSPECTION SYSTEM TO REGISTER IMAGE DATA IN INSPECTION APPARATUS AND EXECUTION OF AN INSPECTION JOB, PRINTING APPARATUS, METHOD FOR CONTROLLING INSPECTION SYSTEM

(71) Applicant: CANON KABUSHIKI KAISHA, Tokyo (JP)

(72) Inventor: Hideshi Ichimi, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/150,051

(22) Filed: Jan. 4, 2023

(65) Prior Publication Data
US 2023/0247146 A1 Aug. 3, 2023

(30) Foreign Application Priority Data
Jan. 26, 2022 (JP) ................. 2022-009848

(51) Int. Cl.
*H04N 1/00* (2006.01)
*G06T 7/00* (2017.01)
*G06V 30/418* (2022.01)

(52) U.S. Cl.
CPC ......... *H04N 1/00082* (2013.01); *G06T 7/001* (2013.01); *H04N 1/00005* (2013.01); *G06T 7/00* (2013.01); *G06V 30/418* (2022.01)

(58) Field of Classification Search
None
See application file for complete search history.

(56) References Cited

U.S. PATENT DOCUMENTS

| | | | |
|---|---|---|---|
| 11,665,289 B2* | 5/2023 | Misaizu | H04N 1/00047 358/1.14 |
| 2014/0285821 A1 | 9/2014 | Regelsberger et al. | |
| 2014/0313256 A1 | 10/2014 | Donaldson et al. | |
| 2020/0013158 A1* | 1/2020 | Asai | G06T 7/0002 |
| 2020/0234421 A1* | 7/2020 | Kaminaka | G06F 3/1204 |
| 2021/0398262 A1* | 12/2021 | Iwano | H04N 1/00034 |
| 2022/0092758 A1* | 3/2022 | Tashiro | H04N 1/00037 |

FOREIGN PATENT DOCUMENTS

JP 2021165020 A 10/2021
WO 2021156785 A1 8/2021

* cited by examiner

*Primary Examiner* — Haris Sabah
(74) *Attorney, Agent, or Firm* — Canon U.S.A., Inc. I.P. Division

(57) ABSTRACT

A printing apparatus capable of communicating with at least an inspection apparatus and a processing apparatus, the printing apparatus comprising one or more controllers having one or more processors and one or more memories, the one or more controllers configured to receive a registration job for registration of image data in the inspection apparatus and an inspection job for execution of an inspection, to transmit, in a case where the registration job is received, image data based on the registration job to the inspection apparatus, to receive a notification of completion of the registration of the image data from the inspection apparatus, and to perform, in a case where the notification is received, control to perform printing based on the inspection job and to transmit an inspection instruction to the inspection apparatus.

17 Claims, 16 Drawing Sheets

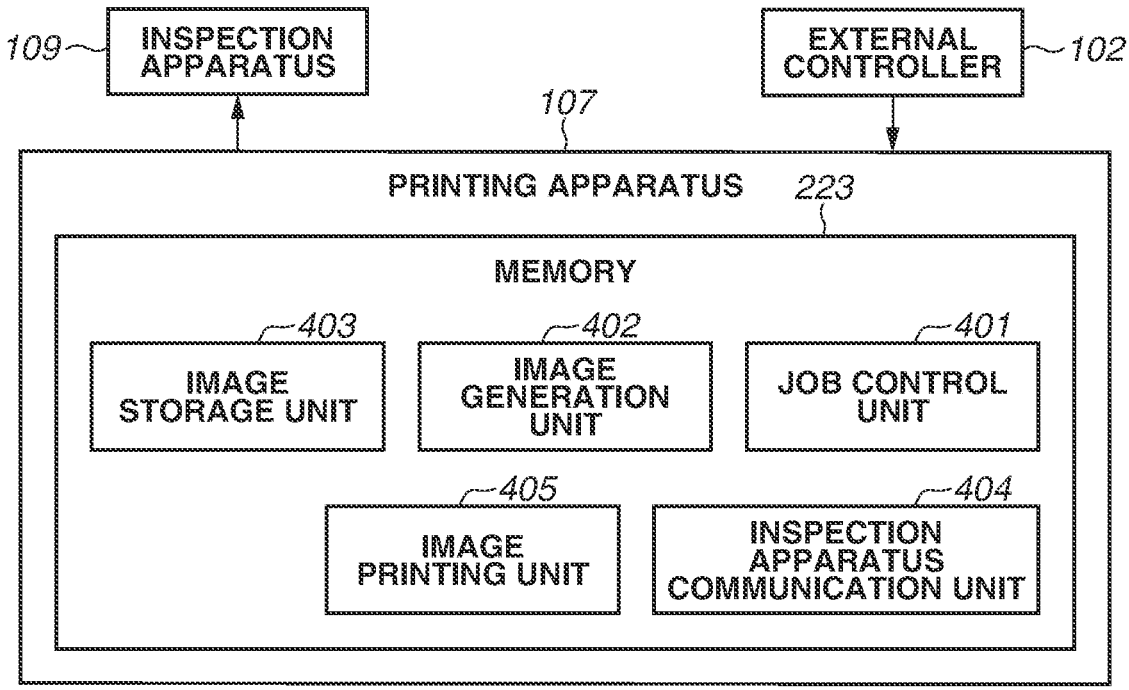
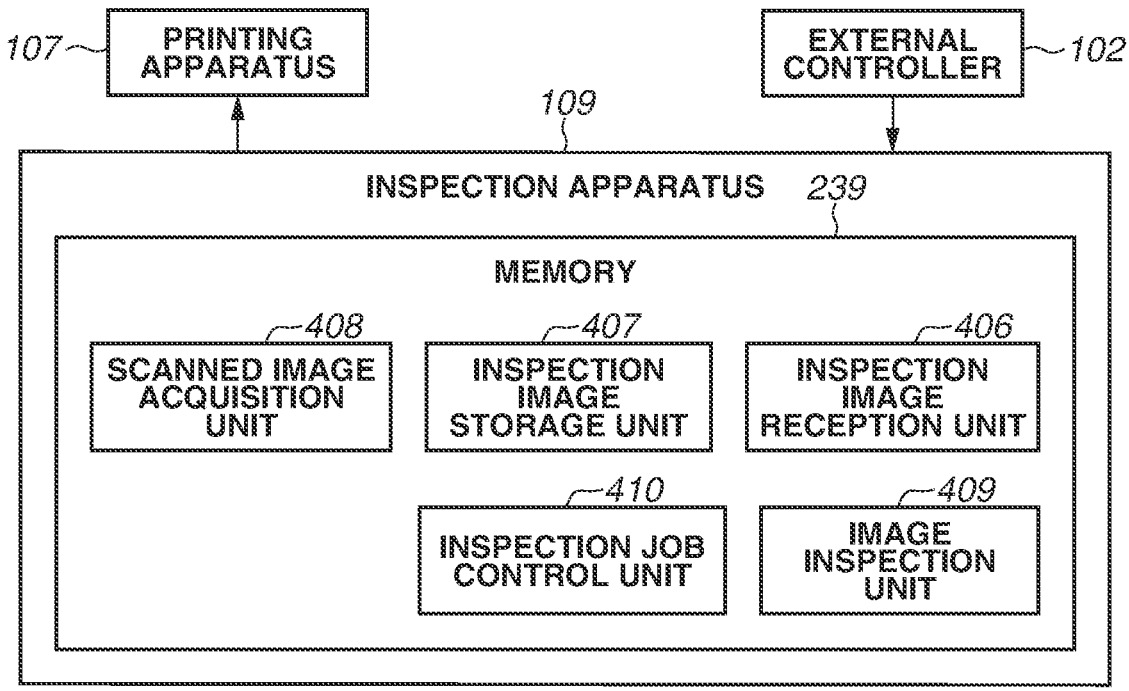

FIG.5

PRINT SETTING — 501

- PAGE RANGE: 1-15 — 502
- NUMBER OF COPIES: 10 — 503
- SHEET FEEDING UNIT: AUTOMATIC — 504
- ONE-SIDED/TWO-SIDED: ONE-SIDED PRINTING — 505
- SHEET TYPE: NORMAL SHEET — 506
- PRINTING ORIENTATION: PORTRAIT — 507
- JOB ANNOTATION: ANNOTATION — 508
- BINDING POSITION: UPPER LEFT — 509
- INSPECTION: ON ● OFF ○ — 510
- INSPECTION IMAGE REGISTRATION: REGISTERED ○ UNREGISTERED ● — 511

512 — OK   CANCEL — 513

FIG.6

```
struct body {
...
...
  Attribute = id_att_medium; (MEDIUM TO BE PRINTED)  ~602
  {
    Type = id_val_medium_type_stationery (NORMAL SHEET)
    Color = id_val_medium_color_white (WHITE)
    Size = id_val_medium_size_iso_a4 (A4)
  };

Attribute = id_att_inspection_setting; (INSPECTION SETTINGS)  ~603
  {
    InspectionMode = id_val_inspection_mode_on(INSPECTION IS TO BE PERFORMED)
    InspectionImageRegist = id_val_inspection_image_not_regist(INSPECTION IMAGE IS UNREGISTERED)
    InspectionImageBox = id_val_inspection_image_box_on(INSPECTION DOCUMENT IS TO BE STORED IN BOX)
  };
}
...
...
```

PRINT SETTING — 1001

- PAGE RANGE: 1-15 — 1002
- NUMBER OF COPIES: 10 — 1003
- SHEET FEEDING UNIT: AUTOMATIC — 1004
- ONE-SIDED/TWO-SIDED: ONE-SIDED PRINTING — 1005
- SHEET TYPE: NORMAL SHEET — 1006
- PRINTING ORIENTATION: PORTRAIT — 1007
- JOB ANNOTATION: ANNOTATION — 1008
- BINDING POSITION: UPPER LEFT — 1009
- INSPECTION: ON ● OFF ○ — 1010
- INSPECTION IMAGE REGISTRATION: REGISTERED ○ UNREGISTERED ● — 1011
- STORE INSPECTION DOCUMENT IN BOX: ON ● OFF ○ — 1012

1013 — OK    CANCEL — 1014

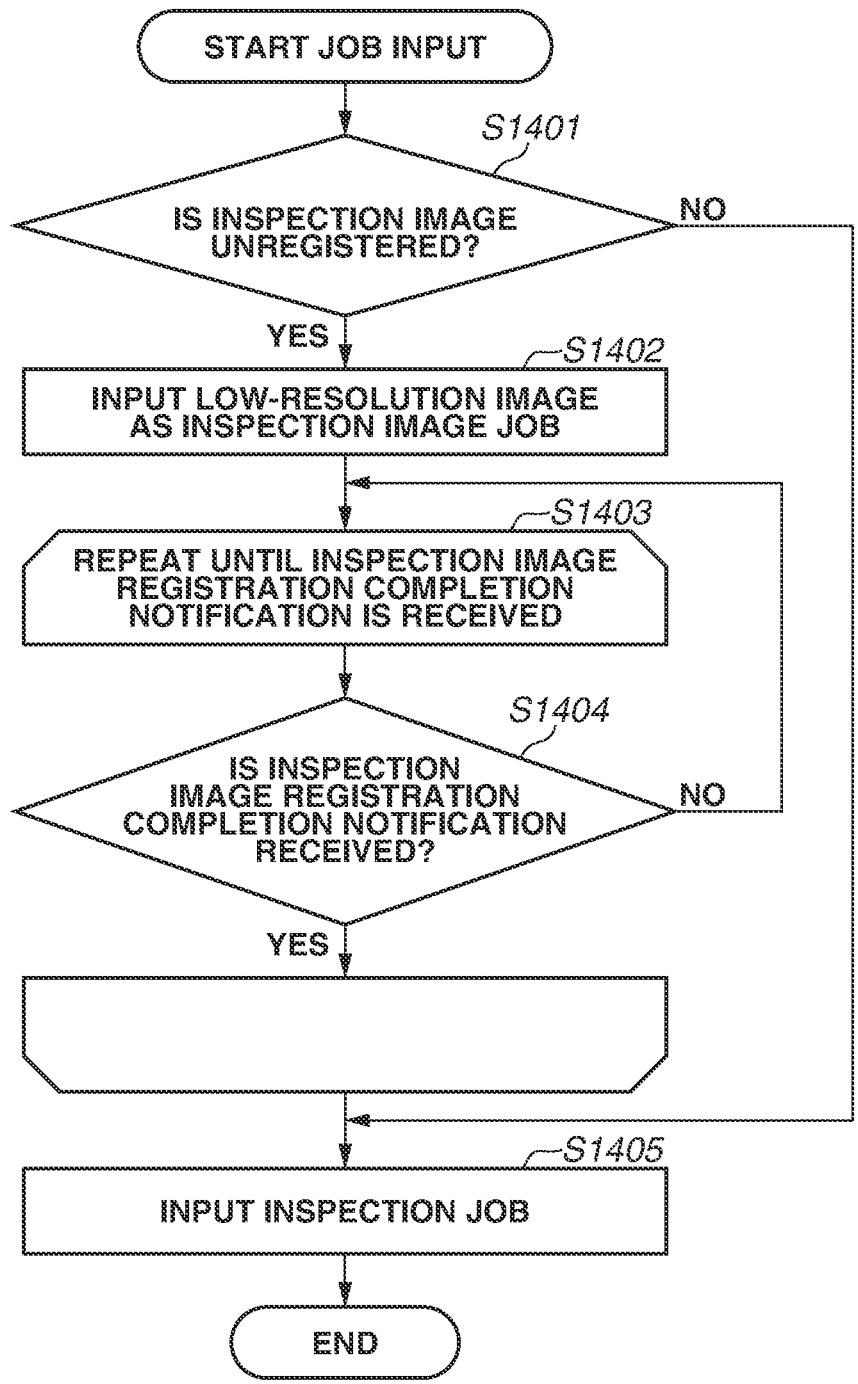

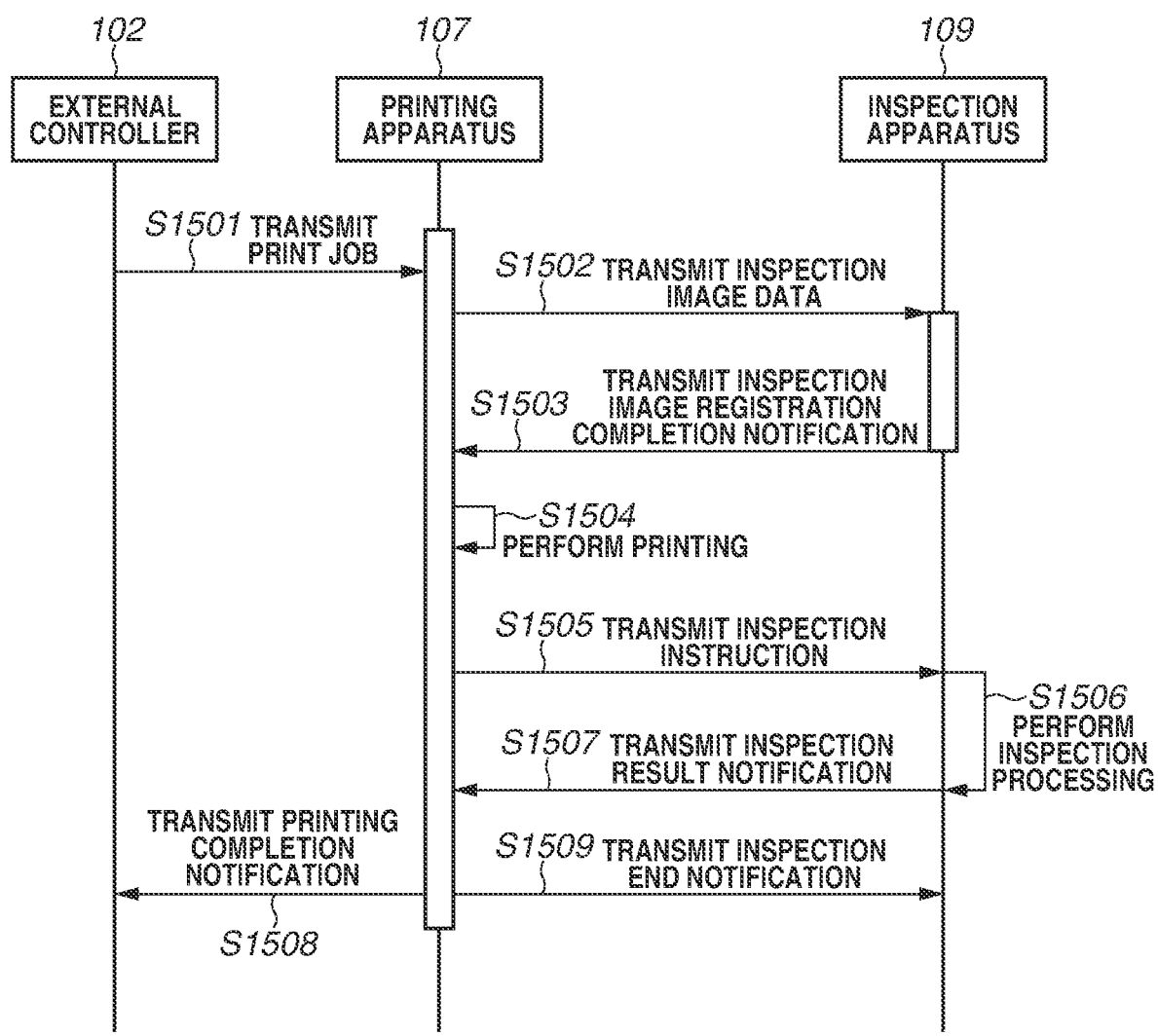

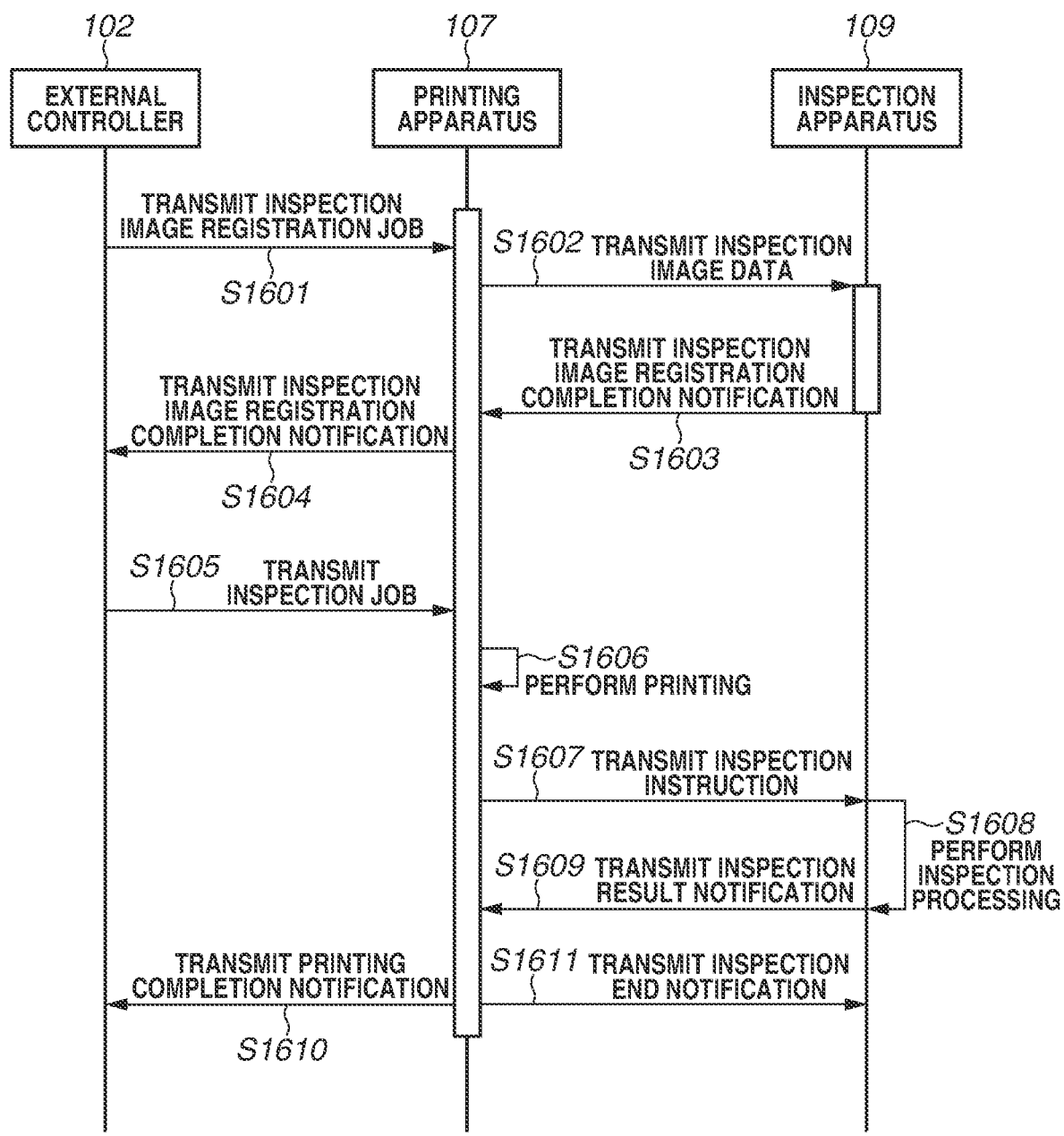

INSPECTION SYSTEM TO REGISTER IMAGE DATA IN INSPECTION APPARATUS AND EXECUTION OF AN INSPECTION JOB, PRINTING APPARATUS, METHOD FOR CONTROLLING INSPECTION SYSTEM

BACKGROUND OF THE INVENTION

Field of the Invention

The present invention relates to an inspection system, a printing apparatus, a method for controlling the inspection system, and a program.

Description of the Related Art

In recent years, printing systems capable of performing an inspection using an inspection apparatus during conveyance of sheets on which printing had been performed by a printing apparatus has been known. In the inspection of the printed sheet, the inspection apparatus scans an image on the conveyed printed sheet and analyzes the scanned image to determine whether the printed sheet is printed normally. More specifically, in the inspection, image data scanned by the inspection apparatus and inspection image data registered in the inspection apparatus are compared with each other. The inspection includes the following processes. First, a user pre-registers an inspection image for use in the inspection in the inspection apparatus. Next, an inspection job is input to the printing apparatus. In the inputting, the user selects an inspection image corresponding to the input inspection job from among inspection images registered in the inspection apparatus. Then, the inspection apparatus can detect, for example, a printing defect by the above-described inspection. A job for pre-registration of an inspection image is referred to as an inspection image registration job, and a print job for inspection of a printed sheet is referred to as an inspection job.

Japanese Patent Application Laid-Open No. 2021-165020 discusses a method for controlling execution of an inspection image registration job and an inspection job. Specifically, an image scan start instruction and an image scan end instruction are received from a user in each of the inspection image registration job and the inspection job.

SUMMARY OF THE INVENTION

According to an aspect of the present invention, a printing apparatus capable of communicating with at least an inspection apparatus and a processing apparatus, the printing apparatus comprising one or more controllers having one or more processors and one or more memories, the one or more controllers configured to receive a registration job for registration of image data in the inspection apparatus and an inspection job for execution of an inspection, to transmit, in a case where the registration job is received, image data based on the registration job to the inspection apparatus, to receive a notification of completion of the registration of the image data from the inspection apparatus, and to perform, in a case where the notification is received, control to perform printing based on the inspection job and to transmit an inspection instruction to the inspection apparatus.

Further features of the present invention will become apparent from the following description of exemplary embodiments with reference to the attached drawings.

BRIEF DESCRIPTION OF THE DRAWINGS

FIG. 4A is a diagram illustrating a software configuration example of a printing apparatus relating to inspection of the printing system. FIG. 4B is a diagram illustrating a software configuration example of an inspection apparatus relating to the inspection of the printing system.

FIG. 5 is a diagram illustrating a screen example that is displayed to input an inspection job to the inspection apparatus.

FIG. 6 is a diagram illustrating an inspection information example that is added to a job to input an inspection job to the inspection apparatus.

FIG. 10 is a diagram illustrating a screen example that is displayed to store, in the printing apparatus, a document to be available for inspection.

FIG. 14 is a flowchart illustrating a process example for inputting of a job from an external controller.

FIG. 15 is a flowchart illustrating an inspection process example that is performed by an image processing system according to a first exemplary embodiment.

FIG. 16 is a flowchart illustrating an inspection process example performed by an image processing system according to a second exemplary embodiment.

DESCRIPTION OF THE EMBODIMENTS

Various exemplary embodiments of the present invention will be described in detail below with reference to the attached drawings. It should be noted that the below-described exemplary embodiments are not intended to limit the scope of the claimed invention and that not all combinations of features described in the exemplary embodiments are always essential to a technical solution provided by the present invention.

According to an exemplary embodiment of the present invention, an external controller will sometimes be referred to as "image processing controller", "digital front end (DFE)", or "print server". An image forming apparatus will sometimes be referred to as "copy machine" or "multi-function peripheral" (MFP).

Figure 1:
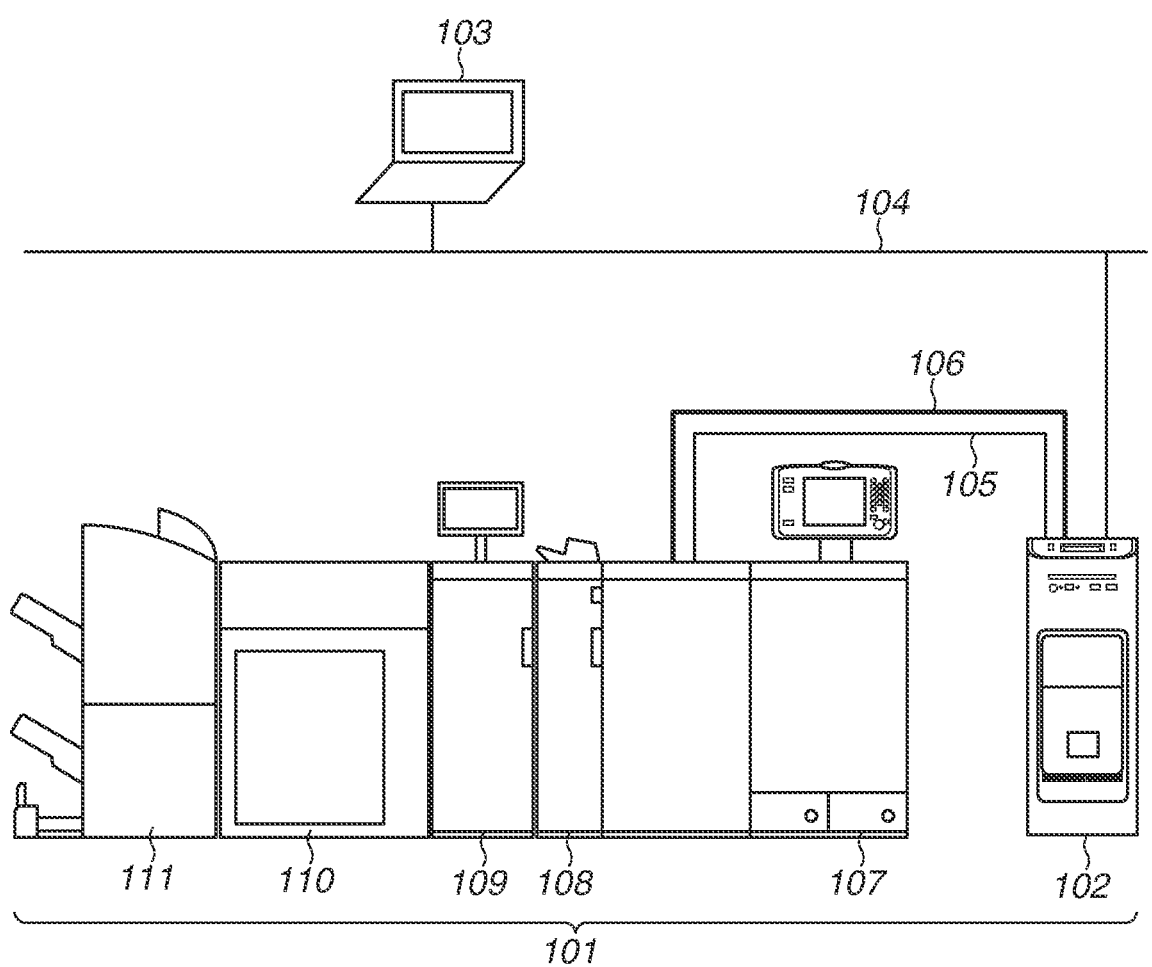
FIG. 1 is a diagram illustrating an overall hardware configuration example of a printing system.

FIG. 1 is an overall diagram illustrating a hardware configuration of an image processing system according to the present exemplary embodiment. The image processing system is also referred to as "inspection system" or "printing system" and includes an image forming apparatus 101 and an external controller 102. The image forming apparatus 101 and the external controller 102 are connected with each other to perform communication via an internal local area network (LAN) 105 and a video cable 106. The external controller 102 is connected to a client personal computer (PC) 103 to perform communication via an external LAN 104, and the client PC 103 issues print instructions to the external controller 102.

A printer driver including a function of converting print data into a print description language processable by the external controller 102 is installed in the client PC 103. A user to perform printing can issue a print instruction from various applications via the printer driver. The printer driver transmits print data to the external controller 102 based on a print instruction from the user. In a case where the external controller 102 receives a print instruction from the client PC 103, the external controller 102 performs data analysis and rasterization processing, inputs print data to the image forming apparatus 101, and issues a print instruction to the image forming apparatus 101.

Next, the image forming apparatus 101 will be described below. A plurality of apparatuses with different functions is connected to the image forming apparatus 101 and is configured to perform complicated print processing, such as bookbinding. Not all of the apparatuses including a printing apparatus 107, an inserter 108, an inspection apparatus 109, a stacker (large-capacity stacker) 110, and a finisher 111 are essential to the image forming apparatus 101.

The printing apparatus 107 forms a toner image on a recording sheet (sheet) conveyed from a sheet feeding unit disposed at a lower portion of the printing apparatus 107. According to the present exemplary embodiment, a printed recording sheet on which an image has been formed is referred to as "printed material". A configuration and an operation principle of the printing apparatus 107 are as described below.

A light beam, such as laser light, modulated based on image data is reflected by a rotary polygonal mirror, such as a polygon mirror, and the reflected light as scan light illuminates a photosensitive drum. An electrostatic latent image formed on the photosensitive drum by the laser light is developed with toner, and the toner image is transferred to a sheet attached to a transfer drum. The foregoing image forming process is sequentially performed using yellow (Y), magenta (M), cyan (C), and black (K) toners, whereby a full-color image is formed on the sheet. The sheet, on which the full-color image has been formed, on the transfer drum is conveyed to a fixing device. The fixing device includes a roller, a belt, and a built-in heat source, such as a halogen heater, in the roller. The fixing device melts the toners of the transferred toner images on the recording sheet and fixes the toners to the recording sheet with heat and pressure.

The inserter 108 is an inserter for inserting an insertion sheet. An insertion sheet can be inserted from the inserter 108 to a position in a set of sheets that have been printed by the printing apparatus 107 and conveyed.

The inspection apparatus 109 is an apparatus that scans an image on a conveyed sheet and performs determination of whether the printed image is normal, by comparing the scanned image with an inspection image registered in advance.

The stacker 110 is a large-capacity stacker on which a large amount of sheets can be stacked.

The finisher 111 is a finisher that performs finishing processing on conveyed sheets. The finisher 111 can perform finishing, such as stapling, punching, and saddle stitch bookbinding, and the finisher 111 discharges sheets to a sheet discharge tray.

While the printing system illustrated in FIG. 1 is configured in such a manner that the external controller 102 is connected to the image forming apparatus 101, the present exemplary embodiment is not limited to the configuration with the external controller 102 being connected. Specifically, the image forming apparatus 101 can be connected to the external LAN 104, and the client PC 103 can transmit print data processable by the image forming apparatus 101. In this case, the image forming apparatus 101 performs data analysis, rasterization processing, and print processing.

Figure 2:
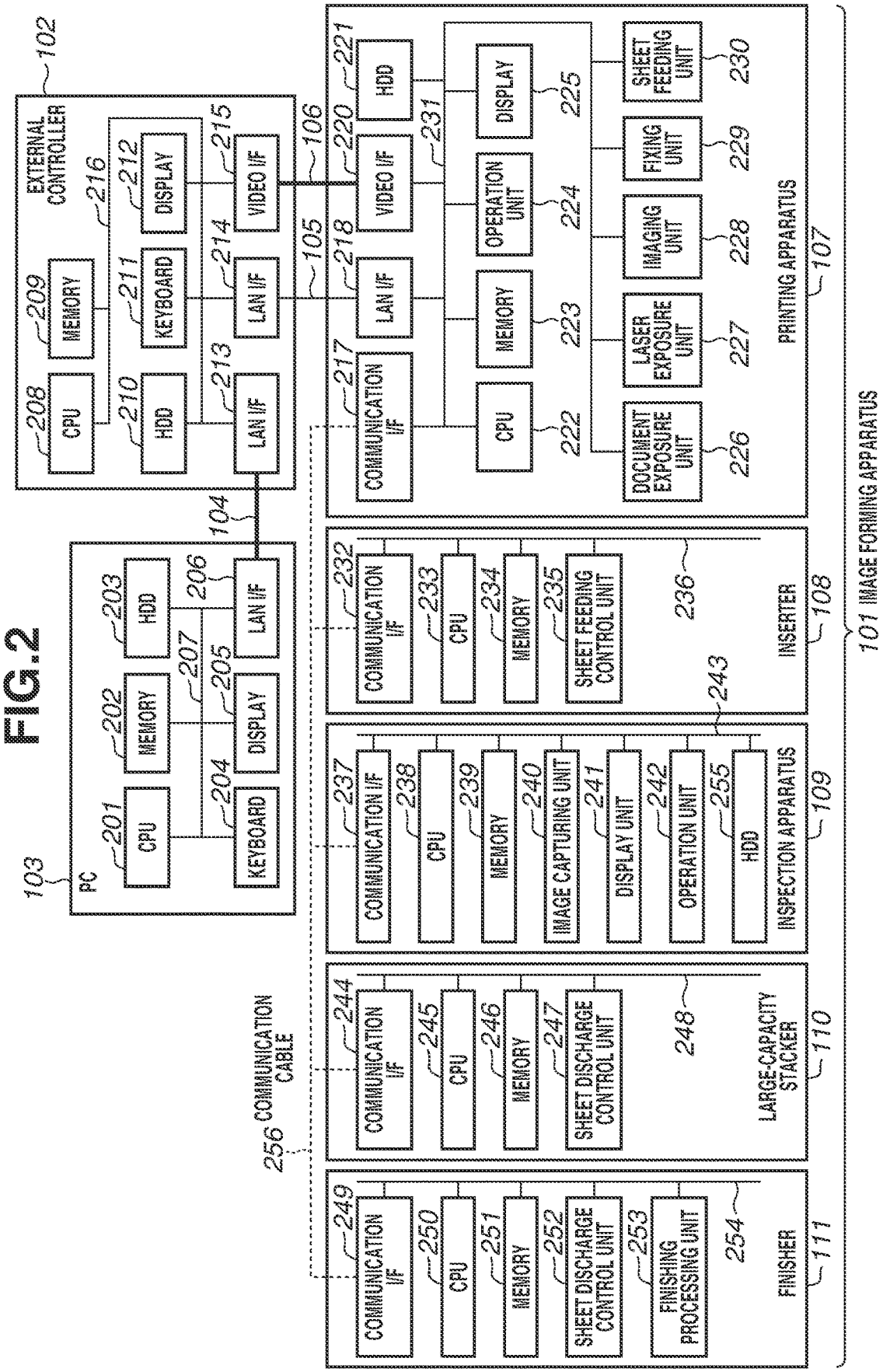
FIG. 2 is a block diagram illustrating a system configuration example of the printing system.

FIG. 2 is a block diagram illustrating a system configuration of the image forming apparatus 101, the external controller 102, and the client PC 103.

First, a configuration of the printing apparatus 107 of the image forming apparatus 101 will be described below. The printing apparatus 107 of the image forming apparatus 101 includes a communication interface (I/F) 217, a LAN I/F 218, a video I/F 220, a hard disk drive (HDD) 221, a central processing unit (CPU) 222, a memory 223, an operation unit 224, and a display 225. The printing apparatus 107 of the image forming apparatus 101 further includes a document exposure unit 226, a laser exposure unit 227, an imaging unit 228, a fixing unit 229, and a sheet feeding unit 230. The foregoing components are connected with each other via a system bus 231.

The communication I/F 217 is connected to the inserter 108, the inspection apparatus 109, the large-capacity stacker 110, and the finisher 111 via a communication cable 254 to perform communication for control of the inserter 108, the inspection apparatus 109, the large-capacity stacker 110, and the finisher 111.

The LAN I/F 218 is connected to the external controller 102 via the internal LAN 105 to communicate print data and the like.

The video I/F 220 is connected to the external controller 102 via the video cable 106 to communicate image data and the like.

The HDD 221 is a storage device storing programs and data.

The CPU 222 comprehensively controls image processing and printing based on programs stored in the HDD 221.

The memory 223 stores programs for various types of processing, which is performed by the CPU 222, and image data and operates as a work area.

The operation unit 224 receives various settings input by the user and operation instructions from the user.

The display 225 displays setting information about an image processing apparatus and a print job processing status.

The document exposure unit 226 performs document reading processing when a copy function or a scan function is used. The document exposure unit 226 reads document data by capturing an image of a sheet placed by the user with a charge-coupled device (CCD) camera while illuminating the sheet with an exposure lamp.

The laser exposure unit 227 is an apparatus that performs primary charging to illuminate the photosensitive drum with laser light to transfer a toner image and performs laser exposure. The laser exposure unit 227 first performs primary charging to charge a surface of the photosensitive drum to a uniform negative potential. Next, a laser driver illuminates the photosensitive drum with laser light reflected from the polygon mirror at adjusted angles. The negative charges on the illuminated portion is neutralized by the laser light, and an electrostatic latent image is formed.

The imaging unit 228 is a device for transferring toner to a sheet. The imaging unit 228 includes a development unit, a transfer unit, and a toner supply unit and transfers toner on the photosensitive drum to a sheet.

In the development unit, negatively-charged toner from a development cylinder is attached to an electrostatic latent image on the surface of the photosensitive drum to visualize the electrostatic latent image. The transfer unit performs primary transfer and secondary transfer. In the primary transfer, a positive potential is applied to a primary transfer roller, and toner on the surface of the photosensitive drum is transferred to a transfer belt. In the secondary transfer, a positive potential is applied to a secondary transfer external roller, and the toner on the transfer belt is transferred to a sheet.

The fixing unit 229 is a device for melting and fixing toner on a sheet with heat and pressure and includes a heating heater, a fixing belt, and a pressing belt.

The sheet feeding unit 230 is a device for feeding sheets. Operations of feeding and conveying of sheets are controlled using rollers and various sensors.

Next, a configuration of the inserter 108 of the image forming apparatus 101 will be described below. The inserter 108 of the image forming apparatus 101 includes a communication I/F 232, a CPU 233, a memory 234, and a sheet feeding control unit 235, and the foregoing components are connected with each other via a system bus 236.

The communication I/F 232 is connected to the printing apparatus 107 via the communication cable 254 to perform communication for control.

The CPU 233 performs various types of control for feeding of sheets, based on control programs stored in the memory 234. The memory 234 is a storage device storing control programs.

The sheet feeding control unit 235 controls feeding and conveying of sheets conveyed from a sheet feeding unit of the inserter 108 or from the printing apparatus 107 while controlling rollers and sensors based on instructions from the CPU 233.

Next, a configuration of the inspection apparatus 109 of the image forming apparatus 101 will be described below. The inspection apparatus 109 of the image forming apparatus 101 includes a communication I/F 237, a CPU 238, a memory 239, an image capturing unit 240, a display unit 241, an operation unit 242, and a HDD 255, and the foregoing components are connected with each other via a system bus 243.

The communication I/F 237 is connected to the printing apparatus 107 via the communication cable 254 to perform communication for control.

The CPU 238 performs various types of control for an inspection based on control programs stored in the memory 239.

The memory 239 is a storage device storing control programs.

The image capturing unit 240 captures images of conveyed sheets based on instructions from the CPU 238. The CPU 238 compares an image captured by the image capturing unit 240 and an inspection image stored in the HDD 255 or the memory 239 and determines whether the printed image is normal.

The display unit 241 displays an inspection result and a setting screen.

The operation unit 242 is operated by the user and receives instructions to change settings of the inspection apparatus 109 and instructions to register an inspection image.

The HDD 255 stores inspection image data together with identification information, such as an inspection image identification (ID).

Next, a configuration of the large-capacity stacker 110 of the image forming apparatus 101 will be described below. The large-capacity stacker 110 of the image forming apparatus 101 includes a communication I/F 244, a CPU 245, a memory 246, and a sheet discharge control unit 247, and the foregoing components are connected with each other via a system bus 248.

The communication I/F 244 is connected to the printing apparatus 107 via the communication cable 254 to perform communication for control.

The CPU 245 performs various types of control for discharging of sheets based on control programs stored in the memory 246.

The memory 246 is a storage device storing control programs.

The sheet discharge control unit 247 controls conveying of sheets based on an instruction from the CPU 245 to convey the conveyed sheet to an escape tray 346 or the subsequent apparatuses, such as the finisher 111.

Next, a configuration of the finisher 111 of the image forming apparatus 101 will be described below. The finisher 111 of the image forming apparatus 101 includes a communication I/F 249, a CPU 250, a memory 251, a sheet discharge control unit 252, and a finishing processing unit 253, and the foregoing components are connected with each other via a system bus 256.

The communication I/F 249 is connected to the printing apparatus 107 via the communication cable 254 to perform communication for control.

The CPU 250 performs various types of control for finishing and discharging of sheets based on control programs stored in the memory 251.

The memory 251 is a storage device storing control programs. The sheet discharge control unit 252 controls conveying and discharging of sheets based on instructions from the CPU 250. The finishing processing unit 253 controls finishing processing, such as stapling, punching, and saddle stitch bookbinding, based on instructions from the CPU 250.

Next, a configuration of the external controller 102 will be described below. The external controller 102 includes a CPU 208, a memory 209, a HDD 210, a keyboard 211, a display 212, a LAN I/F 213, a LAN I/F 214, and a video I/F 215, and the foregoing components are connected with each other via a system bus 216.

The CPU 208 comprehensively performs processing, such as print data reception from the client PC 103, raster image processing (RIP), and print data transmission to the image forming apparatus 101, based on programs and data stored in the HDD 210.

The memory 209 stores programs and data for various types of processing, which is performed by the CPU 208, and operates as a work area.

The HDD 210 stores programs and data for operations, such as print processing.

The keyboard 211 is a device for inputting operation instructions to the external controller 102.

The display 212 displays information about an executed application of the external controller 102 by using video signals of still images and moving images.

The LAN I/F 213 is connected to the client PC 103 via the external LAN 104 to communicate print instructions.

The LAN I/F 214 is connected to the image forming apparatus 101 via the internal LAN 105 to communicate print instructions. The video I/F 215 is connected to the image forming apparatus 101 via the video cable 106 to communicate print data.

Next, a configuration of the client PC 103 will be described below. The client PC 103 includes a CPU 201, a memory 202, a HDD 203, a keyboard 204, a display 205, and a LAN I/F 206, and the foregoing components are connected with each other via a system bus 207.

The CPU 201 generates print data and issues print instructions based on document processing programs stored in the HDD 203. Further, the CPU 201 comprehensively controls the devices connected to the system bus 207.

The memory 202 stores programs and data for various types of processing, which is performed by the CPU 201, and operates as a work area.

The HDD 203 stores programs and data for operations, such as print processing.

The keyboard 204 is a device for inputting operation instructions to the client PC 103.

The display 205 displays information about an executed application of the client PC 103 using video signals of still images and moving images.

The LAN I/F 206 is connected to the external LAN 104 to communicate print instructions.

While the internal LAN 105 and the video cable 106 are connected to the external controller 102 and the image forming apparatus 101 in the above-described configuration, any configurations that enable transmission and reception of data for printing can be used. For example, only the video cable 106 can be used for the connection. The memories 202, 209, 223, 234, 239, 246, and 251 can each be a storage device for holding data and programs. For example, a volatile random access memory (RAM), a non-volatile read-only memory (ROM), a built-in HDD, an external HDD, or a universal serial bus (USB) memory can be used as a substitute.

Figure 3:
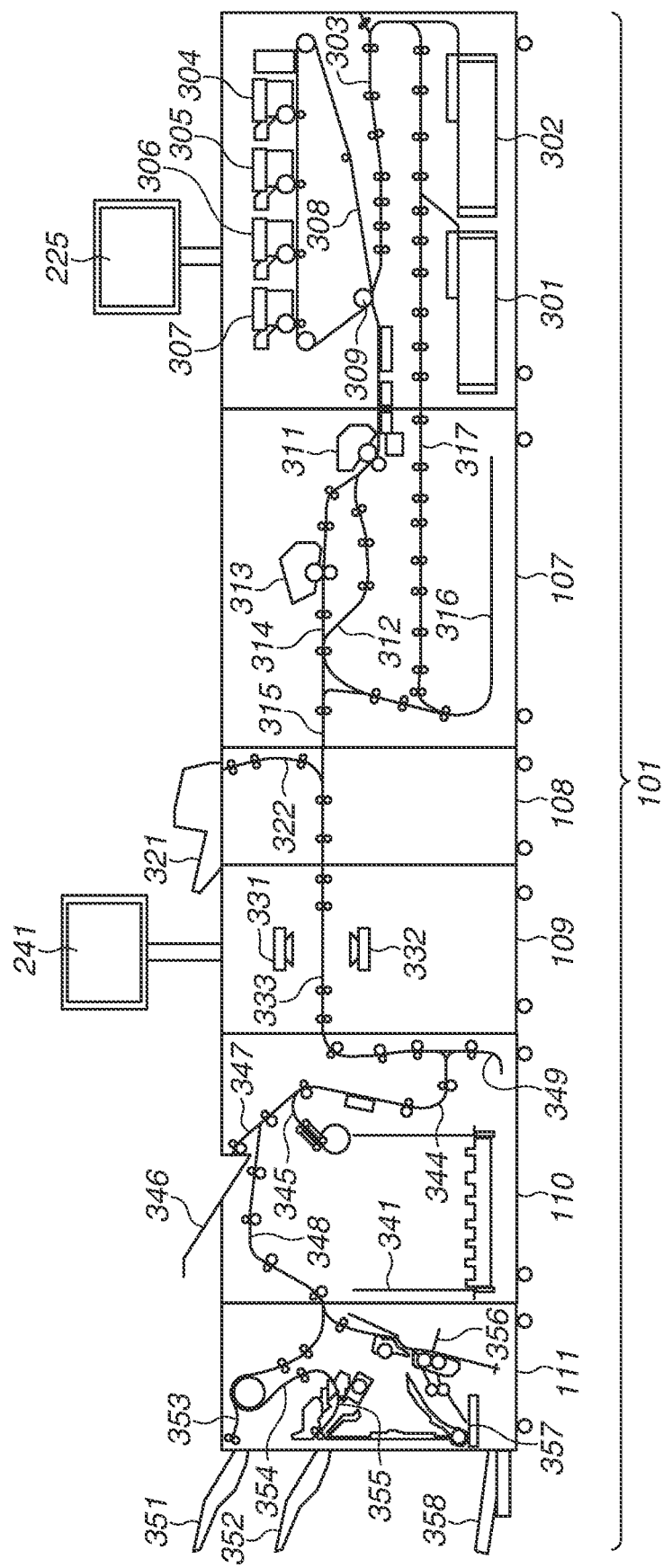
FIG. 3 is a schematic diagram illustrating a cross section of a structure example of an image forming apparatus.

FIG. 3 is a mechanical cross-sectional view illustrating the image forming apparatus 101 illustrated in FIG. 1. The printing apparatus 107 forms images to be printed on sheets. In the image forming apparatus 101, sheet feeding decks 301 and 302 are disposed. The sheet feeding decks 301 and 302 can store various sheets. Information (sheet size, sheet type) about sheets stored in the sheet feeding decks 301 and 302 can be set via the operation unit 224 of the printing apparatus 107.

An uppermost sheet among sheets stored in the sheet feeding decks 301 and 302 is separated from the other sheets and conveyed to a sheet conveyance path 303.

Development stations 304 to 307 form toner images using color toners Y, M, C, and K to form a color image. The formed toner images are primarily transferred to an intermediate transfer belt 308, and the intermediate transfer belt 308 is rotated in a clockwise direction in FIG. 3. At a secondary transfer position 309, the toner images are transferred to a sheet conveyed from the sheet conveyance path 303.

The display 225 displays a printing status of the image forming apparatus 101 and information for settings.

A fixing unit 311 fixes the toner images to the sheet. The fixing unit 311 includes a pressing roller and a heating roller, and when the sheet passes between the pressing roller and the heating roller, the toners are melted and pressed, whereby the toner images are fixed to the sheet. The sheet having passed through the fixing unit 311 is conveyed through a sheet conveyance path 312 to a sheet conveyance path 315.

In a case where further melting and pressing for fixing is needed because of the type of the sheet, the sheet having passed through the fixing unit 311 is conveyed through the above-described sheet conveyance paths to a second fixing unit 313, undergoes further melting and pressing, and is then conveyed through a sheet conveyance path 314 to the sheet conveyance path 315.

In a case where an image forming mode is two-sided, the sheet is conveyed to a sheet reversing path 316, reversed by the sheet reversing path 316, and conveyed to a two-sided conveyance path 317, and the image transfer to a second side of the sheet is performed at the secondary transfer position 309.

The inserter 108 is an inserter for inserting an insertion sheet. The inserter 108 includes an inserter tray 321 and causes a sheet fed through a sheet conveyance path 322 to join the conveyance path. Consequently, the insertion sheet is inserted to a desired position in a sheet set conveyed from the printing apparatus 107 and is conveyed together with the sheet set to a subsequent apparatus.

The printed material (sheet) having passed through the inserter 108 is conveyed to the inspection apparatus 109. In the inspection apparatus 109, cameras 331 and 332 are disposed to face each other. The camera 331 is a camera for scanning an upper surface of the printed material, and the camera 332 is a camera for scanning a lower surface of the printed material.

The inspection apparatus 109 scans images on the sheet using the cameras 331 and 332 at a timing at which the sheet conveyed to a sheet conveyance path 333 reaches a predetermined position, and determines whether the images scanned by the inspection apparatus 109 are normal. The display unit 241 displays a result of the inspection performed by the inspection apparatus 109.

The large-capacity stacker 110 is a stacker on which a large amount of sheets can be stacked. The large-capacity stacker 110 includes a stacking tray 341 as a tray for stacking sheets. The sheet having passed through the inspection apparatus 109 is input to the large-capacity stacker 110 through a sheet conveyance path 344. The sheet is conveyed through a sheet conveyance path 345 from the sheet conveyance path 344 and then stacked on the stacking tray 341.

The stacker 110 further includes the escape tray 346 as a sheet discharge tray. The escape tray 346 is a sheet discharge tray that is used to discharge sheets determined as defective sheets by the inspection apparatus 109. In a case where a sheet is to be output to the escape tray 346, the sheet is conveyed through a sheet conveyance path 347 from the sheet conveyance path 344 to the escape tray 346. In a case where a sheet is to be conveyed to a post-processing apparatus subsequent to the large-capacity stacker 110, the sheet is conveyed through a sheet conveyance path 348.

A reversing portion 349 reverses the sheet. The reversing portion 349 is used when the sheet is stacked on the stacking tray 341. In a case where the sheet is to be stacked on the stacking tray 341, the sheet is reversed by the reversing portion 349, so that an orientation of the sheet at the time of output corresponds to an orientation of the sheet at the time of input. In a case where the sheet is to be conveyed to the escape tray 346 or the subsequent post-processing apparatus, since the sheet is to be discharged without being flipped in stacking, the reversing operation by the reversing portion 349 is not performed.

The finisher 111 applies finishing processing to the conveyed sheet based on a function designated by the user. Specifically, the finisher 111 includes finishing functions, such as stapling (single position, double positions), punching (two holes, three holes), and saddle stitch bookbinding.

The finisher 111 includes two sheet discharge trays 351 and 352, and a sheet is output to the sheet discharge tray 351 through a sheet conveyance path 353. The finishing processing, such as stapling, cannot be performed through the sheet conveyance path 353. In a case where the finishing processing, such as stapling, is to be performed, the sheet is conveyed through a sheet conveyance path 354, and a processing unit 355 performs the finishing function designated by the user. Then, the resulting sheet is output to the sheet discharge tray 352.

Because the sheet discharge trays 351 and 352 can each be moved upward and downward, the sheet discharge tray 351 can be moved downward to stack the sheet having undergone the finishing processing by the processing unit 355 on the sheet discharge tray 351. In a case where the saddle stitch bookbinding is designated, a saddle stitch processing unit 356 staples in a center of the sheet and then folds the stapled sheet in half, and the resulting sheet is conveyed through a sheet conveyance path 357 and is output to a saddle stitch bookbinding tray 358. The saddle stitch bookbinding tray 358 has a belt-conveyor configuration, and the saddle-stitch bound sheets stacked on the saddle stitch bookbinding tray 358 are conveyed leftward.

FIG. 4A is a software configuration diagram illustrating the printing apparatus 107 that relates to the inspection of the printing system. The software configuration is realized by the CPU 222 developing programs and data stored in the HDD 221 on the memory 223 and executing the developed programs and data.

A job control unit 401 analyzes details of a job transmitted from the external controller 102. Information about settings configured for a received job is added to the job, and the job control unit 401 analyzes the information and transmits a processing request together with setting information to a subsequent appropriate program.

An image generation unit 402 converts a document associated with the job transmitted from the external controller 102 into image data. The image generation unit 402 performs processing to generate an image based on a job type, such as a print job and a storing job, and job settings. An inspection image to be registered in the inspection apparatus 109, which will be described below, is also generated by the image generation unit 402.

An image storage unit 403 performs processing to convert a document transmitted from the external controller 102 into an image and store the image in the HDD 221. While a print job normally does not involve storing of an image, the processing of temporarily storing an image in the HDD 221 is performed in a case where the image is stored in the printing apparatus 107 and thereafter is selected via the operation unit 224 of the printing apparatus 107 and printed and also in a case where an inspection image is to be registered in the inspection apparatus 109.

An inspection apparatus communication unit 404 is a processing unit that communicates data with the inspection apparatus 109. The inspection apparatus communication unit 404 detects temporary storage of an inspection image for inspection in the HDD 221 and transmits an inspection image stored in the inspection apparatus 109. Further, the inspection apparatus communication unit 404 issues an inspection start instruction to the inspection apparatus 109 also in a case where the inspection processing is to be performed.

An image printing unit 405 is part of the printing apparatus 107 that performs printing. The image printing unit 405 performs printing based on a job transmitted from the external controller 102.

FIG. 4B is a software configuration diagram illustrating the inspection apparatus 109 that relates to the inspection of the printing system. The software configuration is realized by the CPU 238 developing programs and data stored in the HDD 255 on the memory 239 and executing the developed programs and data.

An inspection image reception unit 406 receives an inspection image transmitted from the inspection apparatus communication unit 404.

An inspection image storage unit 407 stores an inspection image received by the inspection image reception unit 406 together with identification information, such as an inspection image ID, in the HDD 255.

A scanned image acquisition unit 408 captures an image of a conveyed sheet with the image capturing unit 240 and acquires a read scanned image.

An image inspection unit 409 performs inspection by comparing a scanned image and an inspection image. The scanned image is a scanned image acquired by the scanned image acquisition unit 408, and the inspection image is an inspection image that is stored in the inspection image storage unit 407 and corresponds to the scanned image. The image inspection unit 409 can perform inspection by extracting feature amounts of the scanned image and the inspection image and comparing the extracted feature amounts.

An inspection job control unit 410 performs determination of whether an inspection image for use in inspection processing is registered in the inspection image storage unit 407. According to the present exemplary embodiment, the determination of whether an inspection image for use in inspection processing is registered in the inspection image storage unit 407 is performed using identification information, such as an inspection image ID, in a case where an inspection start instruction inquiry is received from the printing apparatus 107.

FIG. 5 illustrates an example of a job setting screen that is displayed on the display 212 of the external controller 102 when inspection and inspection image registration are performed. The print settings can be considered as an example of a screen of the printer driver that is installed in the client PC 103 and supports the image forming apparatus 101. The user to perform printing opens the screen via various applications and can issue a print instruction.

A print setting screen 501 includes a textbox 502 for designating a page range and textboxes and menus 502 to 509 for designating print settings to be applied to the page range designated in the textbox 502. On the print setting screen 501, for example, the number of copies, sheet feeding unit, one-sided/two-sided, sheet type, printing orientation, job annotation, and binding position can be designated.

A number-of-copies textbox 503 is a textbox for designating the number of copies of the page range designated in the textbox 502.

A sheet feeding unit pull-down menu 504 is a menu for selection of a sheet feeding unit from which sheets are to be fed among the decks of the sheet feeding unit 230. In FIG. 5, automatic is selected as an example.

A one-sided/two-sided pull-down menu 505 is a menu for selection of one-sided printing or two-sided printing. In FIG. 5, one-sided printing is selected as an example.

A sheet type pull-down menu 506 is a menu for selection of a sheet type, such as normal sheet and thick sheet. In FIG. 5, normal sheet is selected as an example.

A printing orientation pull-down menu 507 is a menu for selection of portrait or landscape.

A job annotation textbox 508 is a textbox for inputting of an annotation about the job.

A binding position pull-down menu 509 is a menu for designating a binding position, and upper left, upper right, lower left, or lower right can be selected.

An inspection setting 510 is a selection item for designation of whether to perform inspection processing. In a case where ON is selected, the job is determined as an inspection target job, and in a case where OFF is selected, the job is determined as a normal job without performing an inspection.

An inspection image registration item 511 indicates a status of inspection image registration in the inspection apparatus 109, and the status can be selected. In a case where there is not even one inspection record, "unregistered" is selected, and in a case where an inspection job is previously performed at least once, "registered" is selected. The inspection image registration item 511 can be controlled to display a pre-selected state. Specifically, for example, a log of previously-performed inspection jobs is stored in the HDD 210 of the external controller 102, and various application programs, such as the printer driver, are controlled to determine "unregistered" or "registered". In a case where a job is previously inspected and an inspection image is to be registered explicitly for the same job, the user can select "unregistered" of the inspection image registration item 511. While the options of the inspection image registration item 511 in FIG. 5 are "registered" and "unregistered", descriptions of the options of the inspection image registration item 511 are not limited, and the options can be "register inspection image" and "not register inspection image".

An OK button 512 is to complete the print settings and perform print processing. In response to pressing of a cancel button 513, the print settings and the print processing are canceled.

FIG. 6 illustrates an example of a diagram of structured information set on the job setting screen in FIG. 5.

Components for forming a job are assembled together into a single piece by structuring information. The structured information can be transmitted from the external controller 102 to the printing apparatus 107.

Job information 601 indicates data on information about how a document to be input as the job is to be processed, and includes information about each item of the print setting screen 501 and information added as a default.

Medium-to-be-printed information 602 on the fourth line in FIG. 6 indicates information about a sheet to be printed.

Setting values, such as the sheet type selected in the sheet type pull-down menu 506, are configured in the Medium-to-be-printed information 602.

Inspection setting information 603 on the eleventh line in FIG. 6 indicates information about inspection settings. A setting value of the inspection setting 510 and a setting value selected as the inspection image registration item 511 in FIG. 5 are configured in the inspection setting information 603.

As described above, the structured information obtained by structuring all pieces of information, such as the print settings, is added as part of print job data, and the print job data with the added structured information is transmitted from the external controller 102 to the printing apparatus 107. According to an aspect of the present invention, a print job includes at least the structured information illustrated as an example in FIG. 6 and a document (image) to be printed.

FIG. 15 is a diagram illustrating a procedure of data communication between the apparatuses according to a first exemplary embodiment.

In step S1501, the external controller 102 transmits a print job to the printing apparatus 107. The print job herein includes an image (document) to be printed and job information about printing of the image that is illustrated as an example in FIG. 6. Jobs include an inspection image registration job for a process of registering an inspection image in the inspection apparatus 109, a normal job for printing using the printing apparatus 107, and an inspection job for printing using the printing apparatus 107 and inspecting the printed document using the inspection apparatus 109. According to the present exemplary embodiment, the term "print job" is a generic term for a job that includes both an inspection image registration job and an inspection job, a job that includes only an inspection job, or a job that includes only a normal job.

In step S1502, the printing apparatus 107 having received the print job including the inspection image registration job from the external controller 102 transmits inspection image data to the inspection apparatus 109. Consequently, processing of registering the received inspection image data is performed in the inspection apparatus 109. The inspection image registration processing in the inspection apparatus 109 will be described below with reference to FIG. 8.

In step S1503, the inspection apparatus 109 transmits an inspection image registration completion notification to the printing apparatus 107.

In step S1504, the printing apparatus 107 having received the inspection image registration completion notification from the inspection apparatus 109 performs printing based on the print job received in step S1501.

In step S1505, in a case where the received print job includes an inspection job, the printing apparatus 107 transmits an inspection instruction (inspection start instruction) to the inspection apparatus 109. The inspection instruction herein is an instruction including an inspection image ID corresponding to the printed material to be inspected. Alternatively, information from which the inspection image is identifiable can be used instead of the inspection image ID. The inspection image registration completion notification from the inspection apparatus 109 can serve as a trigger to perform steps S1504 and S1505 simultaneously, or step S1504 can be performed following step S1505.

In step S1506, the inspection apparatus 109 performs inspection processing. The inspection processing by the inspection apparatus 109 will be described below with reference to FIG. 9.

In step S1507, the inspection apparatus 109 transmits an inspection result notification to the printing apparatus 107.

In step S1508, the printing apparatus 107 having received the inspection result from the inspection apparatus 109 transmits a printing completion notification to the external controller 102. In step S1509, the printing apparatus 107 having received the inspection result from the inspection apparatus 109 transmits an inspection completion notification (inspection end notification) to the inspection apparatus 109. The inspection result notification from the inspection apparatus 109 can serve as a trigger to perform steps S1508 and S1509 simultaneously, or step S1508 can be performed following step S1509.

A procedure of performing the inspection image registration processing and the inspection processing in the image processing system (inspection system) according to the present exemplary embodiment is as described above. The inspection image registration processing and the inspection processing in each apparatus will be described below.

Figure 7:
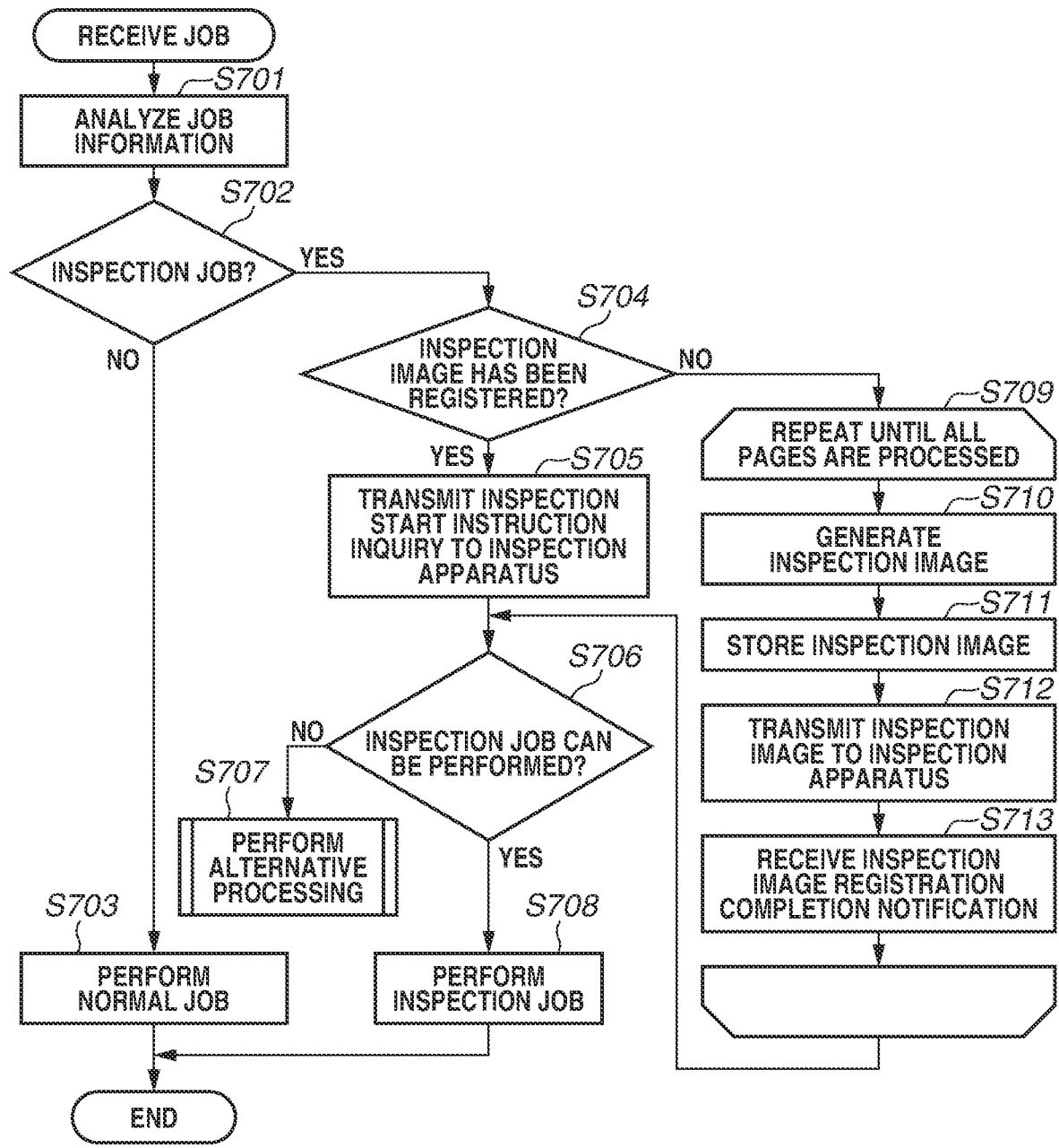
FIG. 7 is a flowchart illustrating an example of process for registration of an inspection image and printing in a case where the printing apparatus receives a job.

FIG. 7 is a flowchart illustrating the inspection processing and the inspection image registration processing by the printing apparatus 107 after the job that is set on the print setting screen 501 in FIG. 5 is received. The process in FIG. 7 is performed by the CPU 208 of the printing apparatus 107. The process in FIG. 7 will be described below with reference to the software configuration diagram in FIG. 4A.

The flowchart in FIG. 7 is started in a case where the printing apparatus 107 receives a print job including an image (document) to be printed and job information about printing of the image as illustrated as an example in FIG. 6 from the external controller 102. The print job does not have to be transmitted collectively from the external controller 102 to the printing apparatus 107. For example, the transmission can be performed in two steps. Specifically, first, the job information is transmitted from the external controller 102, and then in a case where the external controller 102 receives an image reception request from the printing apparatus 107, the external controller 102 transmits the image.

In step S701, the job control unit 401 analyzes the job information transmitted from the external controller 102. For example, the structured information illustrated in FIG. 6 is analyzed. While the data structured as illustrated in FIG. 6 is described as an example according to the present exemplary embodiment, the data to be analyzed in FIGS. 6 and 7 is not limited to the structured information.

In step S702, the job control unit 401 determines whether the job is an inspection job, based on a result of the analysis in step S701. In a case where the job control unit 401 determines that the job is not an inspection job, based on a result of the analysis (NO in step S702), the processing proceeds to step S703. In step S703, the job is processed as a normal job. The normal job refers to a job for execution of printing and is not an inspection target job involving storing of a document or an image. On the other hand, in a case where the job control unit 401 determines that the job is an inspection job (YES in step S702), the processing proceeds to step S704.

In step S704, the job control unit 401 determines whether an inspection image has been registered as a result of the analysis in step S701. In a case where the job control unit 401 determines that an inspection image has been registered, as a result of the analysis (YES in step S704), the processing proceeds to step S705. On the other hand, the job control unit 401 determines that an inspection image has not been registered (NO in step S704), the processing proceeds to step S709. In step S709, the inspection image registration processing is started.

In step S705, an inspection start instruction inquiry is transmitted to the inspection apparatus 109. Specifically, the inspection instruction contains inspection image ID information corresponding to the document to be inspected. While the inspection image ID is used in the description of the present exemplary embodiment, any identification information from which the inspection image corresponding to the document to be inspected is identifiable can be used. Operations of the inspection apparatus 109 having received the inspection start instruction inquiry will be described below with reference to FIG. 13.

In step S706, the job control unit 401 determines whether the inspection job can be performed is determined. A result of the inspection start instruction inquiry to the inspection apparatus 109 in step S705 is checked, or determination of whether an inspection image registration completion notification is received in step S713 is determined. In a case where the job control unit 401 determines that the inspection job can be performed (YES in step S706), the processing proceeds to step S708.

In step S708, the inspection job is performed. Specifically, the image printing unit 405 prints the entire inspection target job. Then, the process ends.

On the other hand, in a case where the printing cannot be started (NO in step S706), the processing proceeds to step S707. In step S707, alternative processing is performed. A possible reason why the printing cannot be started is a case where the corresponding inspection image is not in the inspection apparatus 109 due to deletion of the inspection image registered in the inspection apparatus 109 although the inspection has previously been performed. Another possible case where it is determined that the printing cannot be started is a case where the printing apparatus 107 and the inspection apparatus 109 cannot properly communicate with each other as a result of the inspection start instruction in step S705.

In the alternative processing, the processing can return to step S704, and after the job control unit 401 determines that no inspection image is registered, the processing can proceed to the inspection image registration processing. Then, after an inspection image is registered, the printing can be started. Alternatively, after a notification is transmitted to the external controller 102 and an error screen is displayed, a job can be input again based on a user instruction. Alternatively, the operation unit 224 of the printing apparatus 107 can display an error and prompt the user to specify whether to perform the inspection image registration or to cancel the printing.

From step S709, steps S710 to S713 are repeatedly performed.

In step S710, the image generation unit 402 generates an inspection image based on data transmitted from the external controller 102. Generation of an inspection image is different from generation of an image of a normal print job or a storing job in that the processing for inspection images for inspection includes color conversion and is performed at a low resolution and at an increased compression rate, for example.

The processing for inspection images is to improve the performance of transmission to the inspection apparatus 109.

In step S711, the inspection image generated by the image generation unit 402 is temporarily stored in a specific area of the HDD 221.

In step S712, the inspection apparatus communication unit 404 detects the storing of the inspection image in the HDD 221 and transmits the inspection image to the inspection apparatus 109. In transmitting the inspection image to the inspection apparatus 109, an inspection image ID associated with an inspection target document can be transmitted together with the inspection image. In a case where the processing is performed on the last page, a notification notifying that the page is the last page is simultaneously transmitted.

In step S713, the inspection apparatus communication unit 404 receives a registration completion notification from the inspection apparatus 109, and the process is repeated until the last page. In a case where a notification notifying that the last inspection image is registered is received, similarly, the inspection image registration processing is ended, and the processing proceeds to step S706.

In a case where the inspection image registration processing is ended in step S713, a notification can be transmitted from the printing apparatus 107 to the external controller 102, and in a case where a job is received from the external controller 102, the processing can proceed to step S701.

While the inspection image registration and the inspection processing are collectively performed in the procedure according to the present exemplary embodiment, the operations can be divided in such a manner that after the inspection image registration, the print setting screen 501 in FIG. 5 is displayed again to set the inspection image registration to "registered" and a job is input again.

Figure 13:
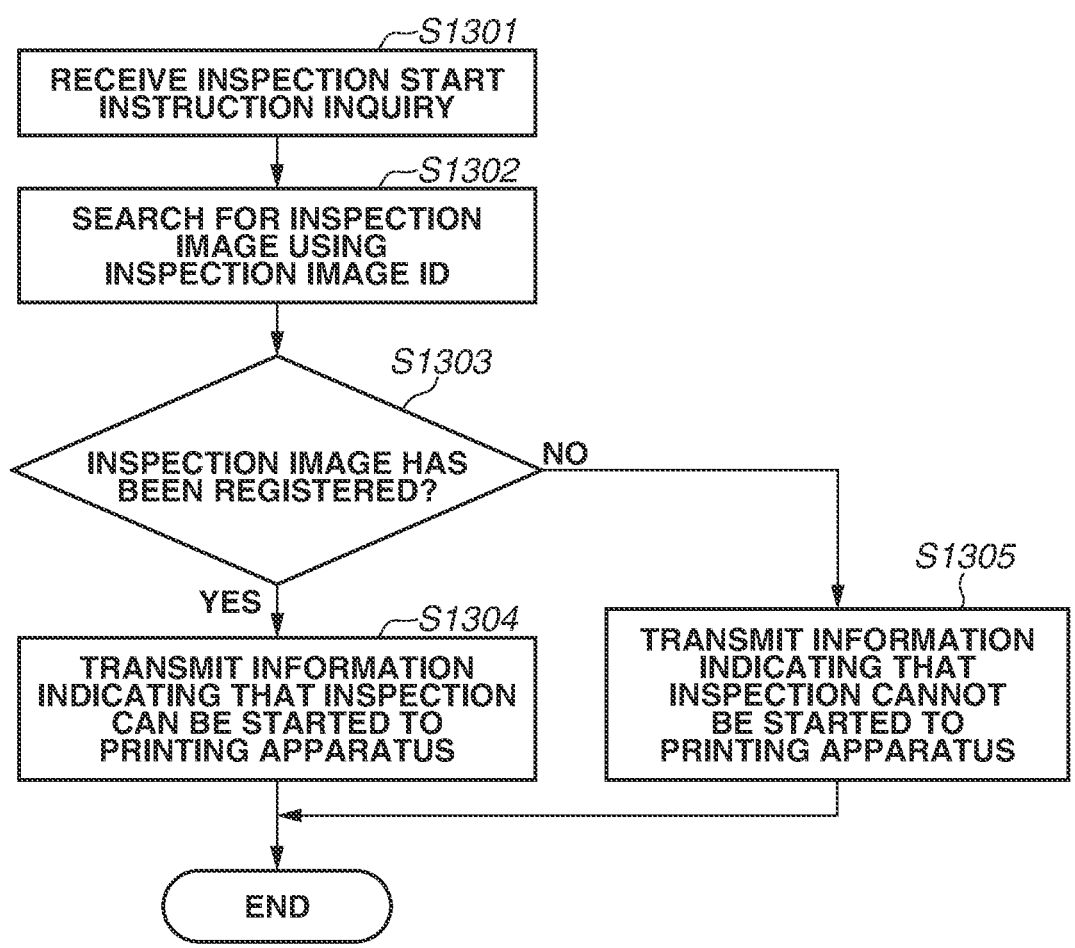
FIG. 13 is a flowchart illustrating a process example that is performed by the inspection apparatus to determine whether an inspection image is registered.

FIG. 13 is a flowchart illustrating a process that is performed by the inspection apparatus 109 in a case where an inspection start instruction inquiry is transmitted to the inspection apparatus 109 in step S705 in FIG. 7. The flowchart is started in a case where an inspection start instruction inquiry from the printing apparatus 107 is received.

In step S1301, the inspection job control unit 410 of the inspection apparatus 109 receives information about the inspection start instruction inquiry.

In step S1302, a search is performed to determine whether an inspection image is registered, using the inspection image ID included in the information received in step S1301. Specifically, the inspection job control unit 410 performs a search to determine whether an inspection image corresponding to the inspection image ID has been registered in the inspection image storage unit 407.

In step S1303, determination for a result of the search in step S1302 is performed. In a case where the inspection job control unit 410 determines that an inspection image corresponding to the inspection image ID has been registered (YES in step S1303), the processing proceeds to step S1304. On the other hand, in a case where the inspection job control unit 410 determines that an inspection image corresponding to the inspection image ID has not been registered (NO in step S1303), the processing proceeds to step S1305.

In step S1304, information indicating that the inspection can be started is transmitted to the printing apparatus 107.

In step S1305, information indicating that the inspection cannot be started is transmitted to the printing apparatus 107.

Contents of the information to be transmitted can be any information that specifies whether the inspection can or cannot be started, and details of the contents are not limited. The transmitted information is received by the inspection apparatus communication unit 404 of the printing apparatus 107.

Figure 8:
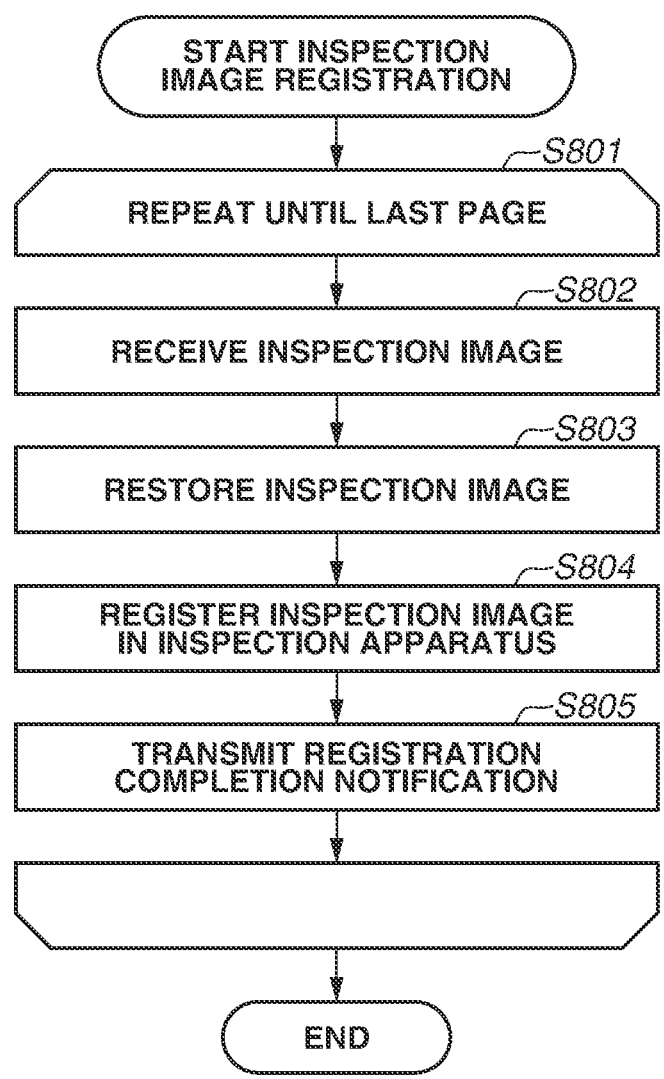
FIG. 8 is a flowchart illustrating an example of a process for reception of an inspection image from the printing apparatus and registration of the inspection image by the inspection apparatus.

FIG. 8 is a flowchart illustrating the inspection image registration processing by the inspection apparatus 109 in a case where an inspection image is transmitted to the inspection apparatus 109 in step S712 in FIG. 7. The process in the flowchart is started in a case where the first page is received.

In step S801, the following process is continued until the inspection apparatus 109 receives information indicating the last image of the inspection image in step S712 from the printing apparatus 107.

In step S802, the inspection apparatus 109 receives the image transmitted from the printing apparatus 107 in step S712.

In step S803, the inspection apparatus 109 restores the received image to an image that can be used in the inspection. This is because special compression for transmission is performed on the inspection image received in step S802.

In step S804, the restored image is registered as an inspection image in the inspection apparatus 109. In registering the inspection image, identification information, such as an inspection image ID, associated with an inspection target document is also registered together with the inspection image.

In step S805, a registration completion notification is transmitted to the printing apparatus 107. In a case where registration of the last image is completed, a notification of information indicating the completion is also transmitted, and the process is ended.

Figure 9:
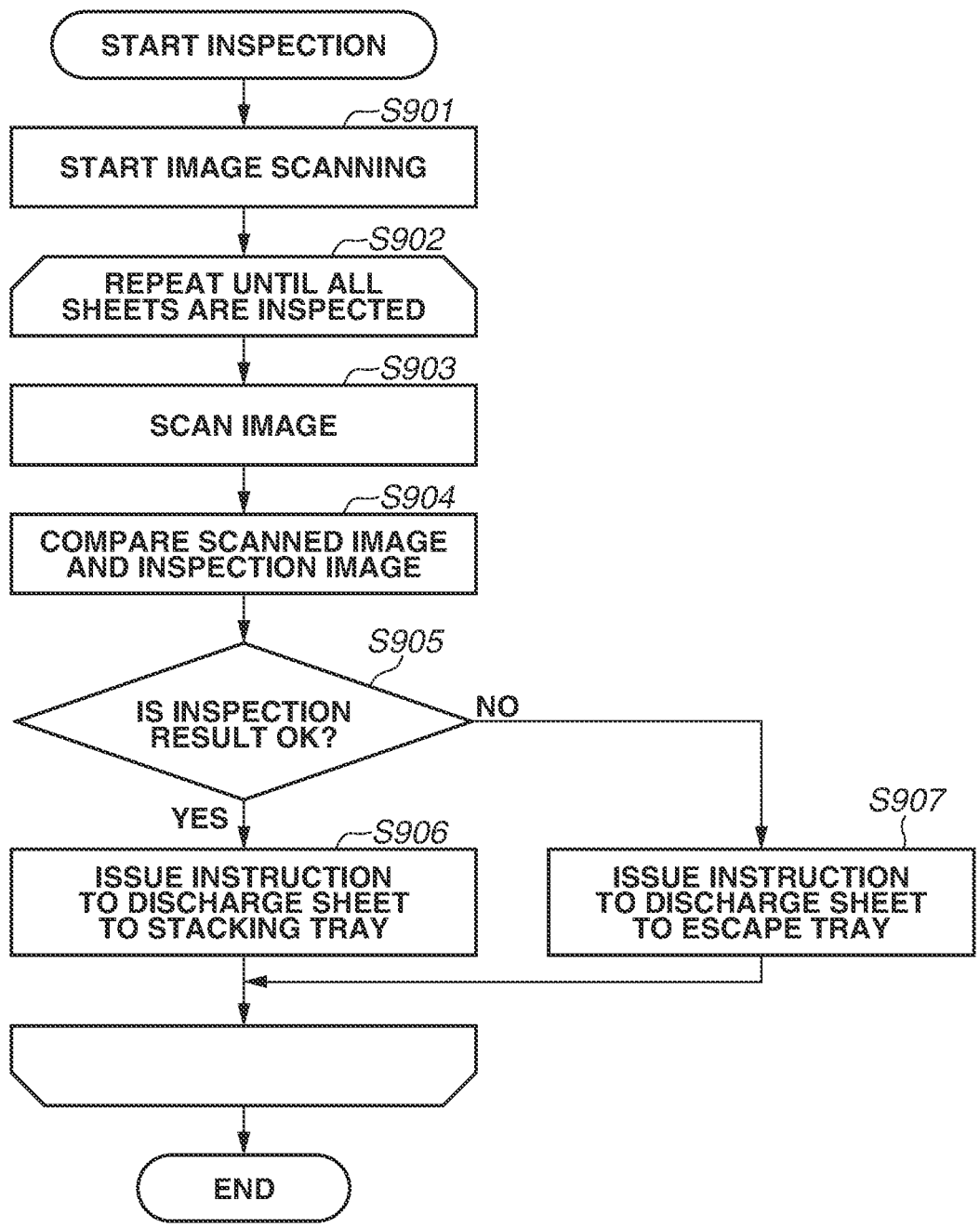
FIG. 9 is a flowchart illustrating an example of an inspection process that is performed by the inspection apparatus to execute an inspection job on a sheet printed by the printing apparatus.

FIG. 9 is an operation flowchart illustrating basic operations of the inspection apparatus 109 during the inspection.

In step S901, in response to receipt of an inspection start instruction transmitted in step S705 in FIG. 7, the cameras 331 and 332 are activated, and the processing of comparing a scanned image and an inspection image is performed.

Next, the processing proceeds to step S902. In step S902, in a case where there is an inspection target sheet, the processing proceeds to step S903.

In step S903, an image on the sheet is scanned using the cameras 331 and 332.

Next, in step S904, an inspection image stored in the memory 239 and the image scanned in step S903 are compared. The inspection image is registered and stored in the memory 239 in the processing of the flowchart in FIG. 8. In the comparison operation, first, image positions on the inspection image and the inspection target scanned image are aligned with each other using feature points of the images as alignment reference points. Next, four corners of the sheet of the inspection target scanned image and the alignment reference points of the scanned image are analyzed, and whether there is a misalignment of the image with respect to the sheet is determined. Next, density values of the inspection image and the inspection target scanned image are compared pixel by pixel. In a case where no defects are detected as a result of the foregoing processing, it is determined that the inspection result is OK. Alternatively, an operation of extracting feature points of the images and comparing the extracted feature points can be performed.

In step S905, the CPU 238 checks the inspection result in step S904.

In a case where the CPU 238 determines that the inspection result is OK (YES in step S905), the processing proceeds to step S906. On the other hand in a case where the inspection result is NG (NO in step S905), the processing proceeds to step S907.

In step S906, for example, an instruction to discharge the sheet to the stacking tray 341 of the large-capacity stacker 110 is issued.

In step S907, for example, an instruction to discharge the sheet to the escape tray 346 of the large-capacity stacker 110 is issued.

Steps S902 to S907 are repeated until all the sheets are inspected. In a case where all the sheets are inspected, the procedure is ended.

While, in the above-described example, the sheet is conveyed to the finisher 111 in a case where the inspection result is OK whereas the sheet is discharged to the escape tray 346 in a case where the inspection result is NG, a sheet discharge destination can be changed based on a user instruction or print settings, and forms thereof are not limited.

As described above, the printing apparatus 107 analyzes the information added to the received job, and in a case where the inspection image registration is necessary, first, an inspection image is registered, and then the inspection is performed, whereby the inspection operation is efficiently performed.

According to the first exemplary embodiment, the job transmission from the external controller 102 to the printing apparatus 107 is performed as a print job before the inspection image registration processing is performed. Alternatively, an inspection image registration job and an inspection job can be transmitted at different timings from the external controller 102 to the printing apparatus 107. According to a second exemplary embodiment, a procedure of a case in which an inspection image registration job and an inspection job are separately input to the printing apparatus 107 will be described below.

FIG. 16 is a diagram illustrating a procedure of data communication between the apparatuses according to the second exemplary embodiment. FIG. 16 illustrates a procedure of a case where the inspection setting 510 is "ON" and the inspection image registration item 511 is "unregistered" on the print setting screen 501 in FIG. 5.

In step S1601, the external controller 102 transmits an inspection image registration job to the printing apparatus 107.

In step S1602, the printing apparatus 107 having received the inspection image registration job from the external controller 102 transmits inspection image data to the inspection apparatus 109. Consequently, the processing of registering the received inspection image data is performed in the inspection apparatus 109. The inspection image registration processing by the inspection apparatus 109 is similar to the inspection image registration processing according to the first exemplary embodiment described above with reference to FIG. 8.

In step S1603, the inspection apparatus 109 transmits an inspection image registration completion notification to the printing apparatus 107.

In step S1604, the printing apparatus 107 having received the inspection image registration completion notification from the inspection apparatus 109 transmits an inspection image registration completion notification to the external controller 102.

In step S1605, the external controller 102 having received the inspection image registration completion notification transmits an inspection job to the printing apparatus 107. The processing of transmitting an inspection image registration job and an inspection job by the external controller 102 will be described below with reference to FIG. 14.

In step S1606, the printing apparatus 107 having received the inspection job from the external controller 102 performs printing based on the received inspection job.

In step S1607, the printing apparatus 107 transmits an inspection instruction (inspection start instruction) to the inspection apparatus 109. The inspection image registration completion notification from the inspection apparatus 109 can serve as a trigger to perform steps S1606 and S1607 simultaneously, or step S1606 can be performed following step S1607.

In step S1608, the inspection apparatus 109 performs the inspection processing. The inspection processing by the inspection apparatus 109 is similar to the inspection processing according to the first exemplary embodiment described above with reference to FIG. 9.

In step S1609, the inspection apparatus 109 transmits an inspection result notification to the printing apparatus 107.

In step S1610, the printing apparatus 107 having received the inspection result from the inspection apparatus 109 transmits a printing completion notification to the external controller 102. In step S1611, the printing apparatus 107 having received the inspection result from the inspection apparatus 109 transmits an inspection end notification to the inspection apparatus 109. The inspection result notification from the inspection apparatus 109 can serve as a trigger to perform steps S1610 and S1611 simultaneously, or step S1610 can be performed following step S1611.

The procedure of the inspection image registration processing and the inspection processing by the image processing system according to the present exemplary embodiment is as described above. The inspection image registration processing and the inspection processing in each apparatus will be described below.

FIG. 14 is a flowchart illustrating a job input process by the external controller 102 in transmitting an inspection image registration job and an inspection job from the external controller 102 to the printing apparatus 107. The procedure is started in a case where a print instruction to perform the inspection image registration and the inspection is received from the user via the print setting screen 501 displayed on the display 212 of the external controller 102.

In step S1401, whether the inspection image is unregistered on the print setting screen 501 in FIG. 5 is determined.

In a case where it is determined that the inspection image registration item 511 is set to "unregistered" (YES in step S1401), the processing proceeds to step S1402. On the other hand, in a case where it is determined that the inspection image registration item 511 is set to "registered" (NO in step S1401), the processing proceeds to step S1405.

In step S1402, the inspection target image is converted into a low-resolution image, and the low-resolution image is input as an inspection image registration job. Converting into a low resolution image is useful for improvement in the performance in inputting a job and transmitting an inspection image and registering the inspection image in the inspection system. Converting into the low resolution can be performed in response to inputting of an inspection image job from the external controller 102 or can be performed in the printing apparatus 107 after the inspection target image is transmitted from the external controller 102 to the printing apparatus 107.

In steps S1403 and S1404, a notification about whether the inspection image input in step S1402 is registered in the inspection system is awaited. Specifically, the processing proceeds to step S1405 in a case where the inspection image registration completion notification in step S1603 in FIG. 16 is received.

In step S1405, an inspection job corresponding to the registered inspection image is input.

In inputting of an inspection image registration job in step S1402 and inputting of an inspection job in step S1405, the same content of the settings is configured on the print setting screen 501 in FIG. 5.

According to the first and second exemplary embodiments described above, information indicating whether the inspection image registration is necessary is added when an inspection job is input. This enables efficient performance of the inspection operation by the printing apparatus 107 and the inspection apparatus 109.

It is, however, not possible to issue an instruction to perform the inspection from an image stored in a storage unit, such as the HDD 221 of the printing apparatus 107, at a timing of when an inspection image is registered. Specifically, even in a case where a previously-inspected document is to be inspected again, reissuance of a print instruction is performed from the external controller 102, and it is not possible to reissue a print instruction from the printing apparatus 107.

This is because RIP for converting a document into an inspection image and RIP for converting a document into a print image for printing are different processing methods. Specifically, printing cannot be performed with a RIP image having undergone the processing of conversion into an inspection image.

A method for performing the inspection by directly designating a document stored in the printing apparatus 107 after the inspection image registration is performed according to a third exemplary embodiment will be described below.

Different points of the present exemplary embodiment from the first exemplary embodiment described above will be described below. Those that are not described in detail are similar to those according to the first exemplary embodiment, and the redundant descriptions are omitted.

FIG. 10 illustrates an example of a print setting screen 1001 for the job that is displayed on the display 212 of the external controller 102 when the inspection and the inspection image registration are performed. The screen is similar to the print setting screen 501 illustrated in FIG. 5 except for a store-in-box item 1012 illustrated as a difference. Screen items 1002 to 1011, 1013, and 1014 of the print setting screen 1001 respectively correspond to the items 502 to 513 of the print setting screen 501 in FIG. 5.

The screen items 1002 to 1011, the OK button 1013, and the cancel button 1014 are similar to those in FIG. 5, and the redundant descriptions are omitted.

The store-in-box item 1012 is an item for specifying whether to store an inspection document in a storage area of the HDD 221 of the printing apparatus 107 when the inspection processing is performed. In a case where the inspection document is stored in the HDD 221, the re-inspection can be performed by selecting the stored document from an application of the printing apparatus 107, so that an inspection job can be performed.

Figure 11:
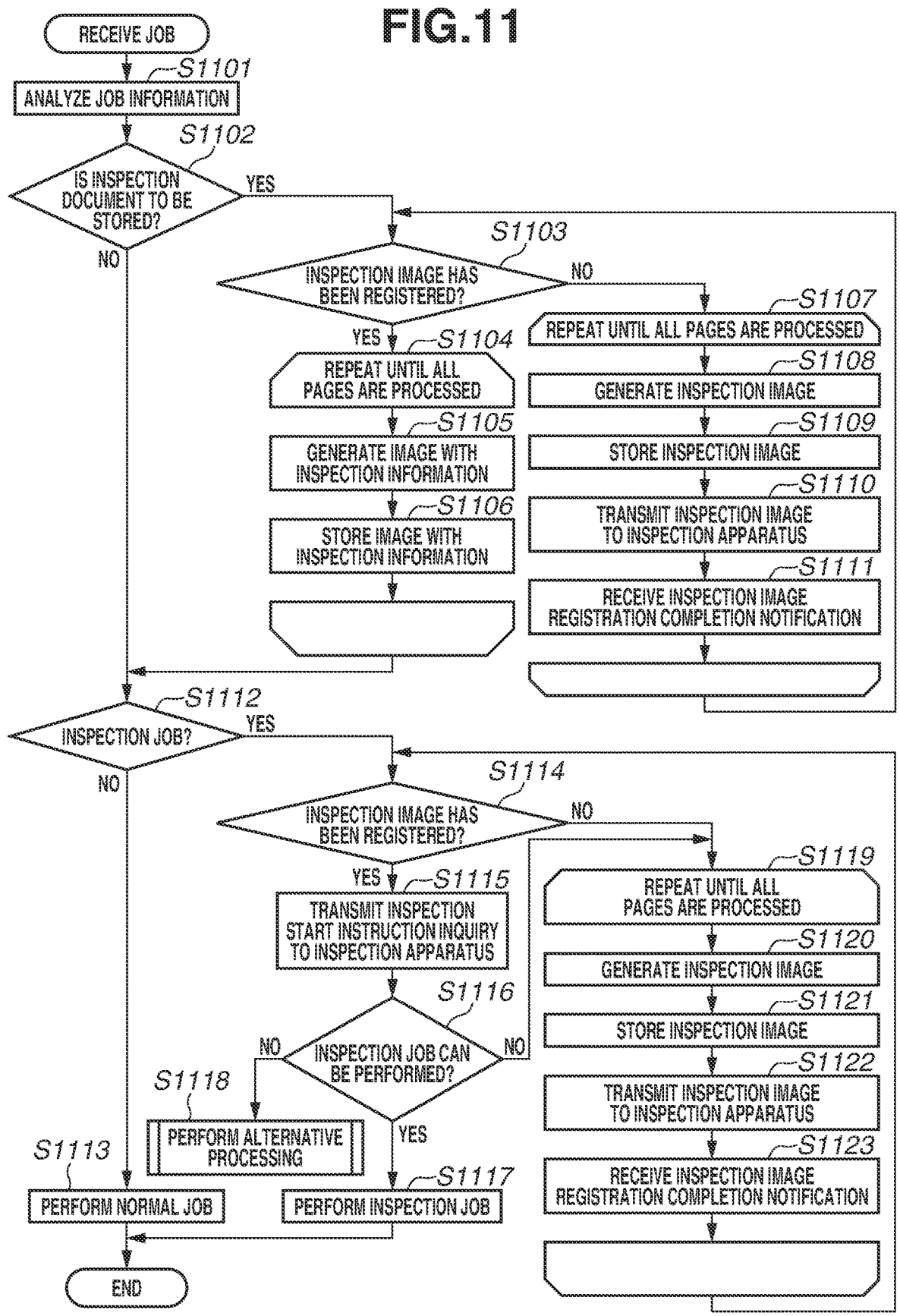
FIG. 11 is a flowchart illustrating a process example for storing and registration of an inspection image in a case where a document to be available for inspection is stored in the printing apparatus.

FIG. 11 is a flowchart illustrating a procedure of the inspection processing and the inspection image registration by the printing apparatus 107 after a job set on the print setting screen 1001 in FIG. 10 is received. The process in FIG. 11 is performed by the CPU 208 of the printing apparatus 107.

In step S1101, the job control unit 401 analyzes job information transmitted from the external controller 102. For example, the structured information illustrated in FIG. 6 is analyzed.

In step S1102, the job control unit 401 determines whether the inspection target document is to be stored in the printing apparatus 107, based on a result of the analysis in step S1101. In a case where the job control unit 401 determines that the inspection document is not to be stored (NO in step S1102), the processing proceeds to step S1112. In step S1112, the job control unit 401 determines whether to perform an inspection job.

On the other hand, in a case where the job control unit 401 determines that the inspection document is to be stored (YES in step S1102), the processing proceeds to step S1103.

In step S1103, the job control unit 401 determines whether an inspection image has been registered, based on a result of the analysis in step S1101. In a case where the job control unit 401 determines that an inspection image has been registered (YES in step S1103), the processing proceeds to step S1104. In step S1104, the job control unit 401 performs processing for printing the inspection document and processing for storing the inspection document.

On the other hand, in a case where the job control unit 401 determines that an inspection image has not registered (NO in step S1103), the processing proceeds to step S1107. In step S1107, the inspection image registration processing is started.

In steps S1104, S1105, and S1106, an image is generated with inspection information added to the inspection target document, and the generated image is stored in the HDD 221. The stored image with the inspection information is stored together with an identifier for association with the inspection image to be transmitted to the inspection apparatus 109 in subsequent step S1110. The identifier can be a file name of the inspection image or an ID that is issued at the time of receiving an inspection image data registration completion notification, or an ID of the job. The image generated in step S1106 is an image that undergoes processing different from the processing performed on the inspection images for inspection and can be designated from an application of the printing apparatus 107 and printed.

Specifically, in RIP for an inspection image, an image is generated by converting a resolution of the image from 600 dpi to a resolution of 300 dpi. However, in the processing in steps S1105 and S1106, because the resolution is the same as the original, i.e., 600 dpi, RIP is performed.

In step S1107 and subsequent steps, steps S1108 to S1111 are repeatedly performed.

In step S1108, the image generation unit 402 generates an inspection image based on data transmitted from the external controller 102. Generation of an inspection image is different from generation of an image of a normal print job and generation of an image of a storing job that is generated in step S1105 in that the processing for inspection images for inspection includes converting colors and is performed at a decreased resolution and an increased compression rate, for example. This is to reduce the time of transmission to the inspection apparatus 109.

In step S1109, the inspection image generated by the image storage unit 403 is stored in a specific area of the HDD 221.

In step S1110, the inspection apparatus communication unit 404 detects the storing of the inspection image in the HDD 221 and transmits the inspection image to the inspection apparatus 109. In a case where the processing is on the last image, a notification notifying that the image is the last image is simultaneously transmitted.

In step S1111, the inspection apparatus communication unit 404 receives a registration completion notification from the inspection apparatus 109, and the processing is repeated until the last image. In a case where a notification notifying that the last inspection image is registered is received, similarly, as described above, the inspection image registration processing is ended, and the processing returns to step S1103. Then, after the inspection image registration is set to "registered" in step S1103, document storage processing in step S1104 and subsequent steps is performed.

Because steps S1112 to S1123 are similar to steps S702 to S713 in FIG. 7, the redundant descriptions are omitted. While the procedure illustrated in FIG. 11 includes the branch point in step S1103 to determine whether an inspection image is registered, the branch point in step S1103 and steps S1107 to S1111 can be omitted.

Figure 12A:
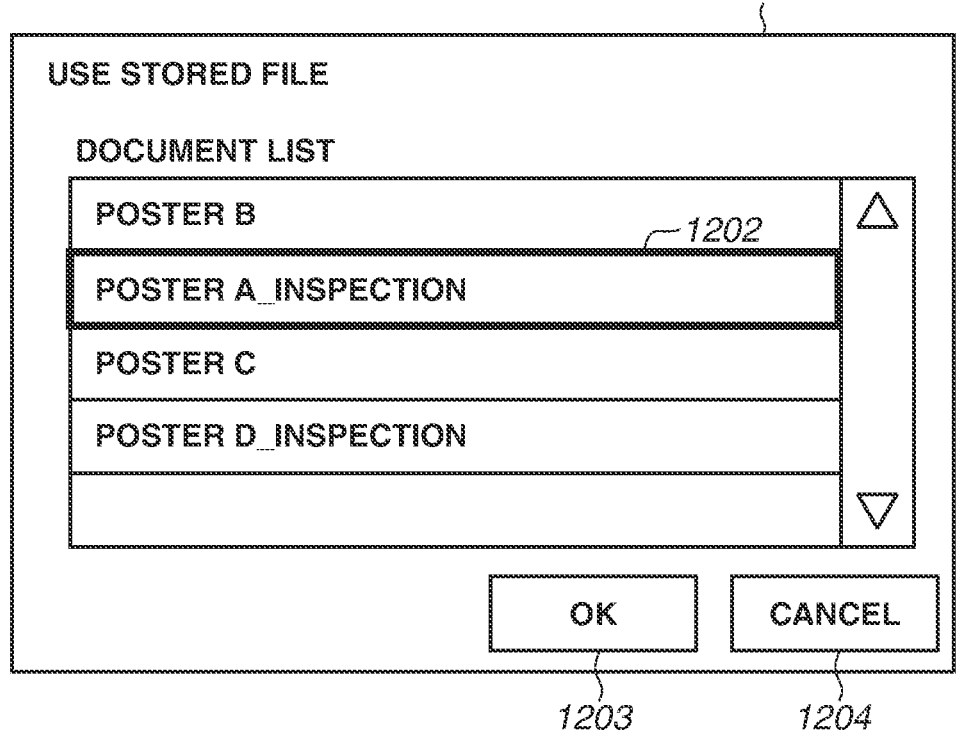
FIG. 12A is a diagram illustrating a screen example that is displayed when a document available for inspection is selected.
Figure 12B:
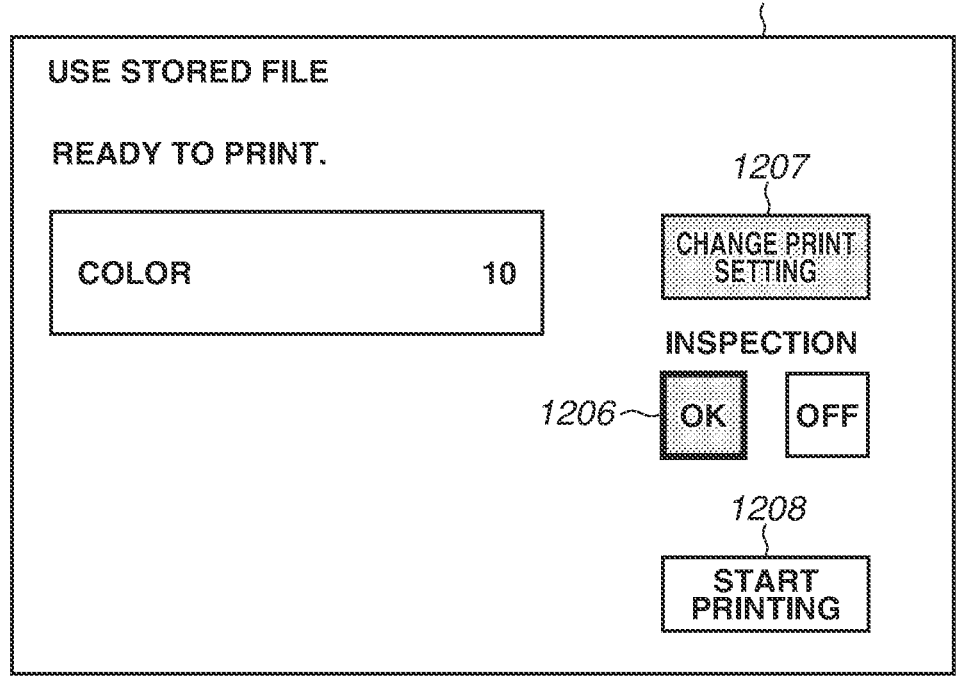
FIG. 12B is a diagram illustrating a screen example that is displayed when an inspection job is input from the printing apparatus.

FIGS. 12A and 12B illustrate an example of a screen on which a document stored in the HDD 221 of the printing apparatus 107 is selected to print the selected document.

A document list screen 1201 in FIG. 12A is a screen that displays a list of documents stored in the HDD 221. The document list includes the documents with the inspection information stored in steps S1105 and S1106 in FIG. 11, normal documents stored in steps S703 and S1113, and documents scanned and stored in the printing apparatus 107.

A document 1202 indicates that a document with inspection information stored in steps S1105 and S1106 is selected, and in a case where an OK button 1203 is pressed, the screen changes to a print settings screen 1205. In a case where a cancel button 1204 is pressed, the application for using a stored file is ended.

The print settings screen 1205 in FIG. 12B is a screen on which the print settings for the document selected on the document list screen 1201 is set to print the selected document. An inspection item 1206 indicates the inspection information registered in steps S1105 and S1106 in FIG. 11. In FIG. 12B, the inspection item 1206 is set to "OK", and in a case where a start-printing button 1208 is pressed, the printing and the inspection processing is performed. A change-print-setting button 1207 cannot be pressed in a case where the inspection item 1206 is set to "ON". In a case where the inspection item 1206 is set to "OFF", the change-print-setting button 1207 is enabled, and the print settings can be changed to perform normal printing. A process of performing the inspection processing from the print settings screen 1205 is similar to the flowchart in FIG. 7, and the redundant descriptions are omitted.

As described above, in addition to the configuration in which the printing and the inspection can be performed directly, a document that can be inspected can be stored in the printing apparatus 107, so that the inspection processing can be performed not only from the external controller 102 but also from the printing apparatus 107, whereby user convenience further improves.

While various examples and exemplary embodiments of the present invention are described above, the intent and scope of the present invention are not limited to any specific descriptions in the present specification.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-009848, filed Jan. 26, 2022, which is hereby incorporated by reference herein in its entirety.

What is claimed is:

1. A printing apparatus capable of communicating with at least an inspection apparatus and a processing apparatus, the printing apparatus comprising one or more controllers having one or more processors and one or more memories, the one or more controllers configured:
to receive a registration job for registration of image data in the inspection apparatus and an inspection job for execution of an inspection;
to transmit, in a case where the registration job is received, image data based on the registration job to the inspection apparatus;
to receive a notification of completion of the registration of the image data from the inspection apparatus; and
to perform, in a case where the notification is received, control to perform printing based on the inspection job and to transmit an inspection instruction to the inspection apparatus.

2. The printing apparatus according to claim 1, wherein the one or more controllers are configured:
to notify, in a case where the notification of completion of the registration of the image data is received from the inspection apparatus, the notification of completion to the processing apparatus;
to receive the inspection job after the notification to the processing apparatus; and
to perform, in a case where the inspection job is received, printing based on the inspection job.

3. The printing apparatus according to claim 1, wherein the one or more controllers are configured to perform, in a case where the notification of completion of the registration of the image data is received from the inspection apparatus, printing based on the inspection job received in advance.

4. The printing apparatus according to claim 1, wherein the inspection instruction is an instruction to inspect a printed material, which is printed by the printing apparatus, based on the registered image data.

5. The printing apparatus according to claim 1, wherein the inspection instruction includes information for identification of the image data that corresponds to a printed material printed by the printing apparatus and has been registered in the inspection apparatus.

6. An inspection system in which at least an inspection apparatus, a printing apparatus, and a processing apparatus are configured to communicate with each other,
wherein the processing apparatus comprises one or more controllers having one or more processors and one or more memories, the one or more controllers configured:
to transmit a registration job for registration of image data in the inspection apparatus to the printing apparatus; and to transmit, in a case where a notification of completion of the registration job is received, an inspection job for execution of inspection processing to the printing apparatus, and wherein the printing apparatus comprises one or more controllers having one or more processors and one or more memories, the one or more controllers configured:

to transmit, in a case where the registration job is received, image data to the inspection apparatus based on the registration job; and to perform control, in a case where the inspection job is received, to perform printing based on the inspection job and to transmit an inspection instruction to the inspection apparatus.

7. The inspection system according to claim 6, wherein the inspection apparatus includes one or more controllers having one or more processors and one or more memories, the one or more controllers configured to perform, in a case where the image data is received, processing of registration of an inspection image and to transmit, in a case where the processing is completed, a notification of completion of the registration of the inspection image to the printing apparatus, and wherein the printing apparatus transmits, in a case where the notification of completion of the registration of the inspection image is received from the inspection apparatus, a notification of completion of the registration job to the processing apparatus.

8. The inspection system according to claim 6, wherein the inspection instruction includes information for identification of the image data that corresponds to a printed material printed by the printing apparatus and has been registered in the inspection apparatus.

9. The inspection system according to claim 6, wherein the inspection apparatus performs inspection processing on a printed material printed by the printing apparatus by using the image data based on the inspection instruction.

10. The inspection system according to claim 6, the system comprising:

a printing unit configured to print an image on a recording sheet;

a registration unit configured to register the image data as an inspection image;

a generation unit configured to scan a printed material obtained by printing on the recording sheet performed by the printing apparatus and to generate a scanned image; and an inspection unit configured to inspect the printed material based on the scanned image generated by the generation unit and the inspection image registered in the registration unit, wherein the image data is registered in the registration unit based on the registration job, and the printing by the printing unit, the generating of the scanned image by the generation unit, and the inspecting of the printed material by the inspection unit are performed based on the inspection job.

11. An inspection system in which at least an inspection apparatus, a printing apparatus, and a processing apparatus are configured to communicate with each other, wherein the processing apparatus includes one or more controllers having one or more processors and one or more memories, the one or more controllers configured to transmit, to the printing apparatus, a print job including at least a registration job for registration of image data in the inspection apparatus and an inspection job for execution of inspection processing, and wherein the printing apparatus includes one or more controllers having one or more processors and one or more memories, the one or more controllers configured to receive a notification of completion of the registration job from the inspection apparatus; and to perform control in such a manner that, in a case where the print job is received, image data is transmitted to the inspection apparatus based on the registration job, and in a case where the notification of completion is received, printing is performed based on the inspection job and an inspection instruction is transmitted to the inspection apparatus.

12. The inspection system according to claim 11, wherein, in a case where the image data is received, the inspection apparatus performs processing for registration of an inspection image, and in a case where the processing is completed, the inspection apparatus transmits a notification of completion of the registration of the inspection image to the printing apparatus, and wherein, in a case where the notification of completion of the registration of the inspection image is received from the inspection apparatus, the printing apparatus transmits a notification of completion of the registration job to the processing apparatus.

13. The inspection system according to claim 11, wherein the inspection instruction includes information for identification of the image data that corresponds to a printed material printed by the printing apparatus and has been registered in the inspection apparatus.

14. The inspection system according to claim 11, wherein the inspection apparatus performs inspection processing on a printed material printed by the printing apparatus by using the image data based on the inspection instruction.

15. The inspection system according to claim 11, the system comprising:

a printing unit configured to print an image on a recording sheet;

a registration unit configured to register the image data as an inspection image;

a generation unit configured to scan a printed material printed on the recording sheet by the printing apparatus and to generate a scanned image; and an inspection unit configured to inspect the printed material based on the scanned image generated by the generation unit and the inspection image registered in the registration unit, wherein the image data is registered in the registration unit, based on the registration job, and the printing by the printing unit, the generating of the scanned image by the generation unit, and the inspecting of the printed material by the inspection unit are performed based on the inspection job.

16. A method for controlling an inspection system in which at least an inspection apparatus, a printing apparatus, and a processing apparatus are configured to communicate with each other, the method comprising:

transmitting, as first transmission, a registration job for registration of image data in the inspection apparatus from the processing apparatus to the printing apparatus;

transmitting, as second transmission, the image data from the printing apparatus having received the registration job to the inspection apparatus, based on the registration job;

registering the image data by the inspection apparatus having received the image data;

transmitting, as third transmission, a notification of completion of the registration job from the inspection apparatus to the printing apparatus and from the printing apparatus to the processing apparatus;

transmitting, as fourth transmission, an inspection job for execution of an inspection processing from the processing apparatus having received the notification of completion of the registration job to the printing apparatus;

performing printing based on the inspection job by the printing apparatus having received the inspection job;

transmitting, as fifth transmission, an inspection instruction to inspect a printed material printed by the printing apparatus from the printing apparatus to the inspection apparatus, based on the inspection job; and inspecting the printed material printed by the printing apparatus by the inspection apparatus, based on the inspection instruction.

17. A method for controlling a system in which at least an inspection apparatus, a printing apparatus, and a processing apparatus are configured to communicate with each other, the method comprising:

transmitting, as first transmission, a print job from the processing apparatus to the printing apparatus;

transmitting, as second transmission, image data from the printing apparatus having received the print job to the inspection apparatus, based on the print job;

registering the image data by the inspection apparatus having received the image data;

transmitting, as third transmission, a notification of completion of the registration of the image data from the inspection apparatus to the printing apparatus;

performing, in a case where the notification of completion of the registration is received, printing based on the print job by the printing apparatus;

transmitting, as fourth transmission, an inspection instruction to inspect a printed material printed by the printing apparatus from the printing apparatus to the inspection apparatus, based on the print job; and inspecting the printed material printed by the printing apparatus by the inspection apparatus, based on the inspection instruction.

* * * * *